US011292123B2

(12) United States Patent
Takagi

(10) Patent No.: US 11,292,123 B2
(45) Date of Patent: Apr. 5, 2022

(54) CONTINUUM ROBOT, MODIFICATION METHOD OF KINEMATIC MODEL OF CONTINUUM ROBOT, AND CONTROL METHOD OF CONTINUUM ROBOT

(71) Applicant: CANON KABUSHIKI KAISHA, Tokyo (JP)

(72) Inventor: Kiyoshi Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 16/326,892

(22) PCT Filed: Aug. 10, 2017

(86) PCT No.: PCT/JP2017/029047
§ 371 (c)(1),
(2) Date: Feb. 20, 2019

(87) PCT Pub. No.: WO2018/037931
PCT Pub. Date: Mar. 1, 2018

(65) Prior Publication Data
US 2019/0184553 A1    Jun. 20, 2019

(30) Foreign Application Priority Data

Aug. 22, 2016  (JP) .............................. JP2016-162297
Apr. 29, 2017  (JP) .............................. JP2017-090882

(51) Int. Cl.
*G05B 19/04* (2006.01)
*B25J 9/06* (2006.01)
*B25J 9/16* (2006.01)

(52) U.S. Cl.
CPC .............. *B25J 9/065* (2013.01); *B25J 9/163* (2013.01); *B25J 9/1625* (2013.01); *G05B 2219/40234* (2013.01)

(58) Field of Classification Search
CPC .......... B25J 9/065; B25J 9/1625; B25J 9/163; G05B 2219/40234
See application file for complete search history.

(56) References Cited

U.S. PATENT DOCUMENTS

| | | | |
|---|---|---|---|
| 6,689,049 B1 * | 2/2004 | Miyagi | A61B 5/05 600/117 |
| 6,869,396 B2 * | 3/2005 | Belson | A61B 1/0016 600/146 |

(Continued)

FOREIGN PATENT DOCUMENTS

JP     2013-541365 A     11/2013

*Primary Examiner* — Harry Y Oh
(74) *Attorney, Agent, or Firm* — Canon U.S.A., Inc. IP Division

(57) ABSTRACT

To provide a technology of reducing a difference with respect to a target position of a curvable portion of a continuum robot which is to move forward substantially along a trajectory including a branched trajectory and a space. A continuum robot includes a plurality of curvable portions separately driven by wires, and control units which control positions of a plurality of curvable portions in accordance with a kinematic model. A modification value for modifying the kinematic model based on a target position and a measured position about each of the cases in which the plurality of curvable portions take a plurality of positions having at least one intersection is calculated. Modification uses a modification result in at least one of the plurality of positions as an initial value to modify the kinematic model in another position, and synthesizes the plurality of modification values.

18 Claims, 21 Drawing Sheets

(56) References Cited

U.S. PATENT DOCUMENTS

| | | | |
|---|---|---|---|
| 8,219,246 B2 | 7/2012 | Buckingham | |
| 9,901,410 B2 * | 2/2018 | Oyola | A61B 34/30 |
| 2004/0111044 A1 * | 6/2004 | Davis | A61M 25/09 |
| | | | 600/585 |
| 2008/0221592 A1 * | 9/2008 | Kawai | A61B 1/0055 |
| | | | 606/130 |
| 2009/0171151 A1 * | 7/2009 | Choset | A61B 1/31 |
| | | | 600/114 |
| 2011/0046925 A1 * | 2/2011 | Bidard | B25J 9/1653 |
| | | | 703/2 |
| 2012/0046522 A1 * | 2/2012 | Naito | A61B 1/0057 |
| | | | 600/118 |
| 2013/0300537 A1 * | 11/2013 | Bajo | A61B 34/30 |
| | | | 340/8.1 |
| 2014/0020953 A1 * | 1/2014 | Chau | E21B 44/00 |
| | | | 175/25 |
| 2014/0330432 A1 * | 11/2014 | Simaan | A61B 34/35 |
| | | | 700/250 |
| 2018/0125593 A1 * | 5/2018 | Sinibaldi | B25J 9/1085 |
| 2019/0321976 A1 * | 10/2019 | Takagi | B25J 9/1625 |

* cited by examiner

CONTINUUM ROBOT, MODIFICATION METHOD OF KINEMATIC MODEL OF CONTINUUM ROBOT, AND CONTROL METHOD OF CONTINUUM ROBOT

TECHNICAL FIELD

The present disclosure relates to a continuum robot, a modification method of a kinematic model of the continuum robot, and a control method of the continuum robot.

BACKGROUND ART

A continuum robot consists of a plurality of curved sections (curvable portions) of a flexible structure, and an entire shape thereof is controlled by transforming or moving the curved sections. This robot is superior to robots constituted by rigid links in two respects. First, a continuum robot is movable along a curve in a narrow space or in an environment with scattered objects where a robot with rigid links may become stuck. Second, since a continuum robot is essentially flexible, the robot can be operated without damaging a vulnerable target object. Therefore, detection of external force needed in a case where a robot with rigid links is used may become unnecessary. According to this feature, application of the continuum robot to the medical field, such as for a sheath of an endoscope or a catheter, and to hazardous environments, such as for rescue robots, is anticipated.

In these technologies, PTL 1 discloses a method for continuously propagating a curving angle of a most distal end to a subsequent curved section with a time difference regarding head end tracking control. PTL 1 also describes a method for accurately following a trajectory by evaluating an area of a curved shape of a robot and a trajectory along which the robot should move forward, and controlling the curved shape. PTL 2 discloses a technology of generating a trajectory of an endoscope from information about a branched blood vessel tree, and controlling a robot so as to guide the endoscope in accordance with the trajectory.

CITATION LIST

Patent Literature

[PTL 1]
U.S. Pat. No. 8,219,246
[PTL 2]
PCT Japanese Translation Patent Publication No. 2013-541365

SUMMARY OF INVENTION

Technical Problem

However, if a trajectory has branched sections, the number of trajectories along which a continuum robot can move forward will increase by a factorial of the number of the branched sections. When an approach of improving accuracy in path tracking by evaluating an area with respect to a trajectory as illustrated in PTL 1 is applied to a branched trajectory, time and storage capacity needed for processing the branched trajectory significantly increase. Further, PTL 2 does not disclose a method for improving performance of control accuracy of a robot with respect to path tracking.

A continuum robot of an aspect of the present disclosure includes a plurality of curvable portions separately driven by a wire and capable of curving; and a control unit configured to control positions of the plurality of curvable portions based on a kinematic model which matches positions of the curvable portions and driving amounts of the wires, wherein the continuum robot further includes a kinematic model modification unit configured to calculate a modification value for modifying the kinematic model based on a target position and a measured position about each of the cases in which the plurality of curvable portions take a plurality of positions having at least one intersection, the kinematic model modification unit uses a modification result in at least one of the plurality of positions as an initial value to modify the kinematic model in another position, and synthesizes the plurality of modification values.

A modification method of an aspect of the present disclosure includes a plurality of curvable portions separately driven by a wire and capable of curving, and a control unit configured to control positions of the plurality of curvable portions based on a kinematic model which matches positions of the curvable portions and driving amounts of the wires, wherein a modification value for modifying the kinematic model based on a target position and a measured position about each of the cases in which the plurality of curvable portions take a plurality of positions having at least one intersection is calculated, and a modification result in at least one of the plurality of positions is used as an initial value to modify the kinematic model in another position, and the plurality of modification values is synthesized.

A control method of an aspect of the present disclosure includes obtaining a curving angle modified by multiplying a curving angle target value of the curvable portion by an inverse matrix of the modification value using the modification method described above, and controlling the curvable portion by a driving displacement of the wire operated in accordance with the modified curving angle.

Advantageous Effects of Invention

According to an aspect of the present disclosure, a difference with respect to a target position of a curvable portion of a continuum robot can be reduced while suppressing an increase of processing time or storage capacity.

Further features of the present invention will become apparent from the following description of exemplary embodiments with reference to the attached drawings.

DESCRIPTION OF EMBODIMENTS

In the present disclosure, a kinematic model can be modified by using a model in consideration of continuity between curvable portions, for example, and a continuum robot can be configured and a control method of a continuum robot can be configured in accordance with the modified kinematic model. The kinematic model here is a kinematic model which correlates a position of a curvable portion and a driving amount of a wire which is a flexible linear body. A kinematic model modification unit modifies this kinematic model by calculating a modification value based on a target position and a measured position regarding each of the cases in which the plurality of curvable portions take a plurality of positions having at least one intersection. "A plurality of positions having at least one intersection" indicates that the positions of the continuum robot cross at positions other than base ends in a state in which the base ends of the continuum robot described below are fixed. Even in a case in which positions from the base ends to certain points between the base ends and the most distal ends of the continuum robot are common and positions of the curved sections from the certain points to the most distal ends are different, these positions can be considered to be a plurality of positions having at least one intersection. Hereinafter, this state may be referred to as "branching". Hereinafter, position may be referred also to as "shape". In modification, a modification result in at least one of a plurality of positions is used as an initial value in modifying the kinematic model in another position, and a plurality of modification values is synthesized (e.g., a mean is obtained).

In the control method, a corresponding one of the curvable portions is controlled by obtaining a driving amount of a wire to obtain a target position by using data of the target position of the curvable portion (a curve target value) and an inverse of a modification value (a value which yields 1 when multiplied by a modification value) in the modified kinematic model. Not only control of a curved amount, which is previously set, but also real-time control of a curved shape by real-time operation can be performed by sequentially adding additional target values of curved shapes to the curve target value. This technology enables head end tracking control.

First Embodiment

Figure 1:
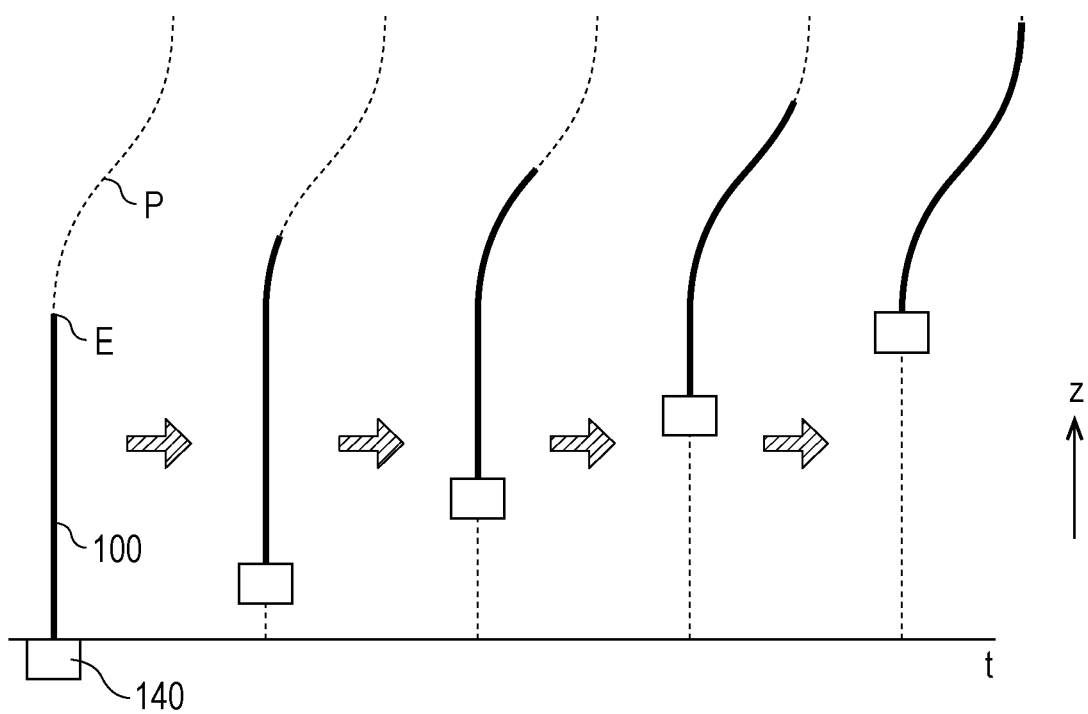
FIG. 1 illustrates head end tracking control according to a first embodiment.

In a first embodiment, head end tracking control with respect to a branched trajectory is performed. As illustrated in FIG. 1, it is assumed that there is a continuum robot 100 which includes a plurality of curved sections (curvable portions) of which base ends are connected to a robot base 140. When the base 140 is moved in a z-axis direction in FIG. 1 with time t, the continuum robot 100 is controlled to take a position along a trajectory P. In this case, controlling the position of the continuum robot 100 so that a curved section subsequent to a most distal end E of the continuum robot 100 to pass through a position through which the most distal end E has passed is referred to as "head end tracking control". The head end tracking control enables the continuum robot to move forward in a narrow space, such as a body cavity, without being stuck.

For the modification of a difference in position of a robot, a method for obtaining a table for modifying a target angle (a target position) of the robot by an auxiliary experiment has been proposed (hereinafter, referred to as "table modification"). In order to apply the table modification method to the head end tracking control, it is necessary to obtain a table for modifying all the shapes of the curved sections of the robot which should move forward along the trajectory. In order to apply the table modification to the branched trajectory, there is a problem that significantly large time and memory are needed for creating the tables.

In the present disclosure, a plurality of unbranched trajectories is extracted from a branched trajectory. Then, some shapes are selected from among the curved shapes which conform to the unbranched trajectories, and a coefficient for modifying a kinematic model of the continuum robot is calculated. The modification coefficient is obtained by measuring the curved shape of the continuum robot in the trajectory, and by using an optimization algorithm. The curved shape used for the measurement is referred to as a "representative shape". No large table is needed since the kinematic model is modified by performing the optimization by using a part of the trajectory, and by reducing the difference in position of the robot.

Figure 8:
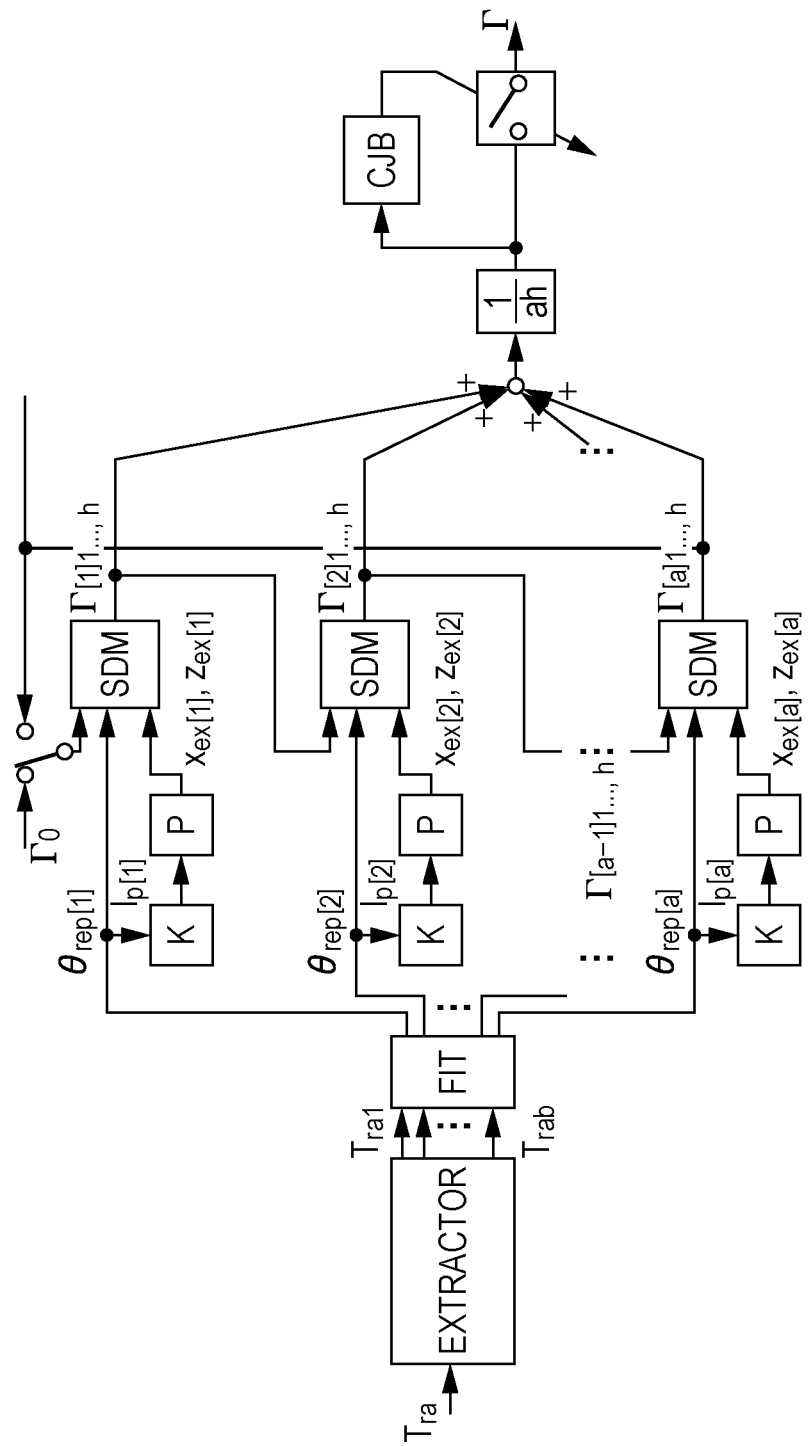
FIG. 8 illustrates an optimization algorithm according to the first embodiment.

An algorithm of the present embodiment is illustrated in FIG. 8 as a block diagram. The reference symbols in the block diagram are defined as follows: $T_{ra}$ denotes a branched trajectory, and Extractor denotes a block for extracting unbranched trajectories from a branched trajectory. $T_{ra1}$ to $T_{rab}$ denote extracted b unbranched trajectories. A Fit block optimizes a target angle for performing head end tracking control with respect to each of the unbranched trajectories. Further, the Fit block selects a curving angle target value vector $\theta_{ref_c}$ for optimization of a modification matrix $\Gamma$ from a curve target angle matrix $\Theta_{ref}$ as a representative shape $\theta_{rep}$. P denotes a continuum robot, and K denotes a block for obtaining driven displacement of a wire with an angle of a distal end of each curved section as a target value.

First, a first representative shape vector $\theta_{rep[1]}$ is set, and the driven displacement of the wire $l_{p[1]}$ is obtained by the wire displacement operation block K. Next, the robot P is controlled by applying the driven displacement of the wire, and measurement displacements $X_{ex[1]}$ and $Z_{ex[1]}$ of the curved shape of the robot are obtained by using a displacement measurement system of distal ends of the curved sections illustrated in FIG. 11. A modification matrix $\Gamma_{[1]1}$ with respect to the first representative shape is obtained by a steepest descent method operation block SDM by using these measurement displacements, the representative shape $\theta_{rep[1]}$, and an initial matrix $\Gamma_0$ of the modification matrix. Next, a modification matrix $\Gamma_{[2]1}$ with respect to a second representative shape is obtained in the same manner. In the present embodiment, the modification matrix $\Gamma_{[1]1}$ obtained with respect to the first representative shape is used as an initial value of the steepest descent method with respect to the second representative shape. This avoids setting of the modification matrix to a local minimum value. Next, a modification coefficient matrix $\Gamma_{[a]1}$ is obtained for each of the a types of representative shapes. The aforementioned procedure is a first iterative trial.

Next, a second iterative trial is performed, in which an initial value of a modification matrix is defined as the modification matrix $\Gamma_{[a]1}$ obtained in the first iterative trial. Thus, the second trial is performed in the same manner as the first trial. The trial is iterated h times and it is determined in a block CJB whether the modification coefficient is sufficiently converged. A mean value of all the modification coefficients is obtained by a mean operation block 1/(ah), and the obtained mean value is defined as a modification matrix $\Gamma$. The mean value may be substituted by another value obtained by synthesizing all the modification coefficients. Another value may be a median value, a weighted mean value in consideration of a weight determined depending on a mode of a representative shape, for example. Any synthesized values which provide sufficient modification effects may be used. The modification matrix $\Gamma_{[a]1}$ and the like can be used as an initial value for modifying the kinematic model in another representative shape (position) by using a modification result in at least one of a plurality of representative shapes (positions).

Hereinafter, derivation of a kinematic model of a continuum robot, a modification matrix optimization algorithm with respect to a branched trajectory, a control system will be described in detail, and responses obtained by experiments will be described. In the first embodiment, there is described a method for modifying the kinematic model described above by introducing a model of continuity between adjacent curved sections, the shape of which is caused by a plurality of mechanical factors in addition to a kinematic model in which the curvature regarding curved sections which are curvable portions is assumed to be piecewise constant. Further, an approach of improving driving and control of a continuum robot by the method will be described. A kinematic model of a continuum robot presents, when data of a target position of a curved section is provided, what kind of position of the curved section is implemented in accordance with a driving amount of an actuator (a control unit) derived from the data based on the mechanism of the continuum robot.

(1. Modeling of Continuum Robot)
(1.1 Derivation of Kinematic Model)

Figure 2:
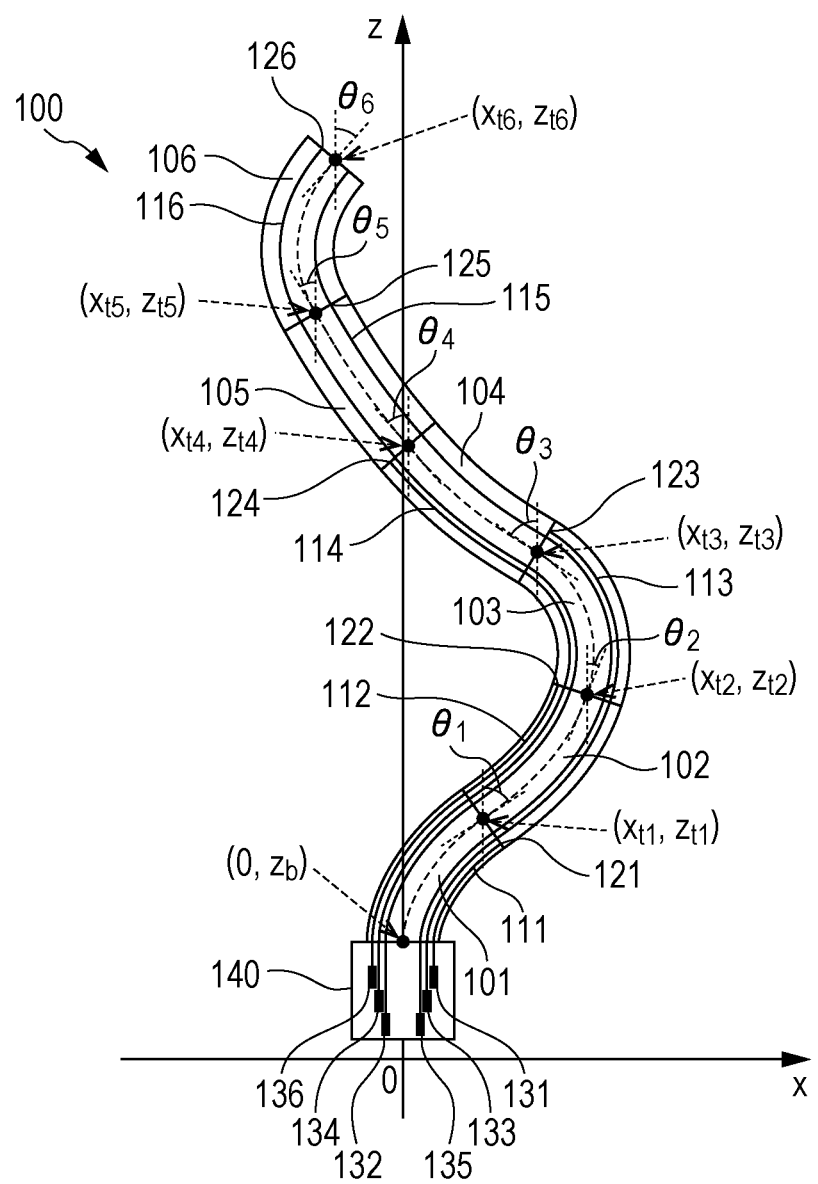
FIG. 2 illustrates a kinematic model according to the first embodiment.
Figure 3:
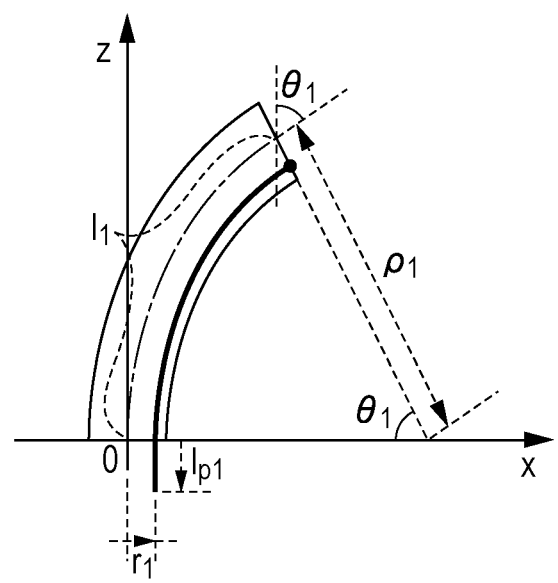
FIG. 3 illustrates a kinematic model according to the first embodiment.

FIG. 2 illustrates a schematic diagram of a continuum robot 100 which includes six curved sections 101 to 106 used in the present embodiment. The continuum robot 100 is cylindrical in shape, for example, and a camera, a treatment tool, and so forth may be inserted in a hollow portion thereof. Driving wires 111 to 116 are connected to distal ends 121 to 126 of the curved sections of the continuum robot 100, respectively, and positions of the curved sections 101 to 106 are controlled by pushing and pulling the wires 111 to 116 by actuators 131 to 136, respectively, installed in the robot base 140. In the example illustrated in FIG. 2, the driving wires 111 to 116 are connected to the distal ends 121 to 126 of the curved sections 101 to 106 alternately on the opposite sides of a central axis, however, positions at which the wires are connected to the curved sections are not limited thereto. The connecting positions may be arbitrarily determined if the positions of the curved sections can be controlled by pushing and pulling the wires. The base 140 has a degree of freedom in the z-axis direction and can detect a displacement. FIG. 3 is a schematic diagram of a structure of the first curving section 101 consisting of a housing and the wire 111. In FIGS. 1 to 3, the central axis of the housing is depicted by the broken line or the dash-dot line.

Definitions of the reference symbols in the following description are as follows. $l_n$: the length of an arm housing in the n-th curved section; $r_n$: the displacement from the central axis of the arm housing to the wire in the n-th curved section; e: the number of curved sections of the robot; $\theta_n$: the angle of the distal end of the n-th curved section; $\rho_n$: the curvature radius in the n-th curved section; $\theta_{refn}$: the target angle of the distal end of the n-th curved section; $l_{pn}$: the driven displacement of the wire in the n-th curved section; $x_{tn}$, $z_{tn}$: the coordinates of the distal end of the n-th curved section; c: the evaluation point of the robot; $x_i$, $z_i$: the i-th coordinates when the robot is divided into c in the longitudinal direction; and $z_b$: the displacement of the base.

Figure 4:
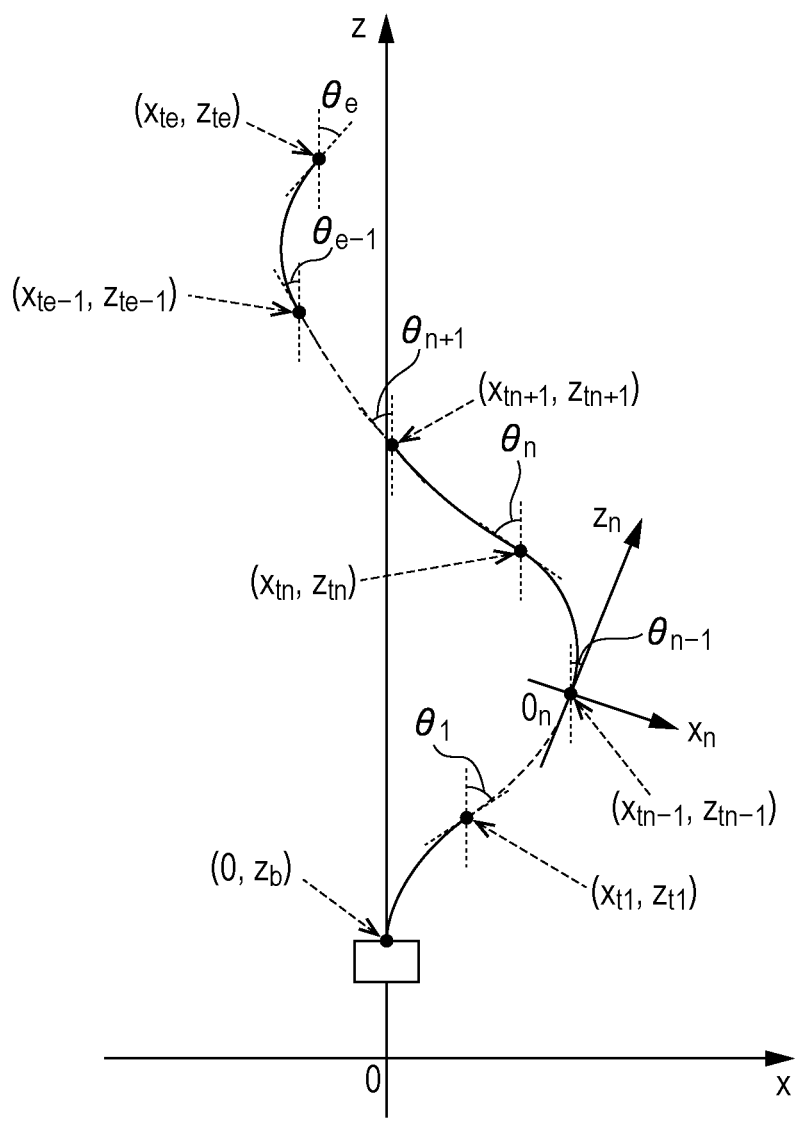
FIG. 4 illustrates a kinematic model according to the first embodiment.

A kinematic model of a continuum robot with n curved sections illustrated in FIG. 4 is derived based on the following assumptions.

1. The housing and the wires deform only horizontal to the drawing plane.
2. In each curved section, the housing and the wire deform at a constant curvature.
3. Twisting deformation of the housing and the wire is not taken into consideration.
4. The housing and the wire do not deform in the longitudinal direction.
5. A wire guide is provided in the housing, and the center of a circular arc of a central axis of the housing and the center of a circular arc made by the wire coincide with each other all the time.
6. Friction between the housing and the wire is not taken into consideration.

First, a relationship between the driven displacement of the wire and an angle of the distal end of the curved section is derived. Considering only the first curving section, the relationship between a driving amount $l_{p1}$ of the wire and an angle $\theta_1$ of the distal end of the first curving section is expressed by Expression (1). Here, since Expression (2) holds, Expression (3) is obtained from Expressions (1) and (2). Next, a relationship between the driven displacement of the wire $l_{pn}$ and the angle $\theta_n$ of the distal end of the n-th curved section is derived. Here, n is 2 or greater. $\tilde{\theta}_n$ ($\theta$ with tilde) which is a curve relative angle in the n-th curved section is defined by Expression (4). As illustrated in FIG. 4

Figure 5:
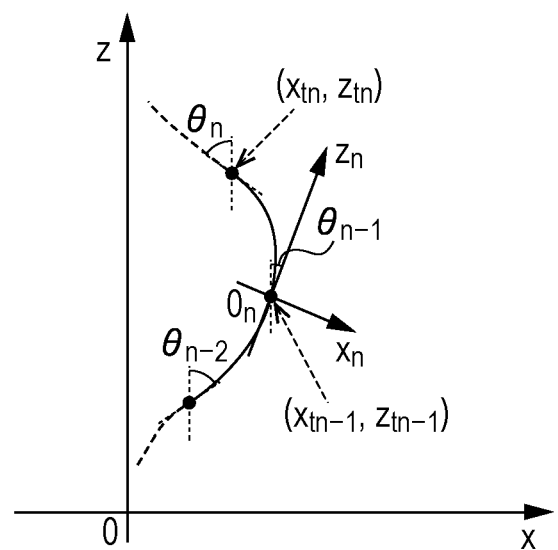
FIG. 5 illustrates a kinematic model according to the first embodiment.

(also see FIG. 5), a relative coordinate system $x_n$-$z_n$ having an origin point ($x_{tn-1}$, $z_{tn-1}$) and having coordinate axes extending in an $\theta_{n-1}$ direction and a direction orthogonal to the $\theta_{n-1}$ direction is established. Then, a relationship between $l_{pn}$ (l with tilde) which is the driven displacement of the wire in the relative coordinate system $x_n$-$z_n$ and $\theta_n$ ($\theta$ with tilde) which is the relative angle of the distal end of the n-th curved section is expressed by Expression (5). The driven displacement of the wire $l_{pn}$ in the n-th curved section becomes the sum of the displacements of the wires for driving the n-th curved section in the relative coordinate system from the first to the (n−1)th sections and is expressed by Expression (6).

[Math. 1]

$$(\rho_1 - r_1)\theta_1 + l_{p1} = l_1 \quad (1)$$

$$l_1 = \rho_1 \theta_1 \quad (2)$$

$$l_{p1} = r_1 \theta_1 \quad (3)$$

$$\tilde{\theta}_n = \theta_n - \theta_{n-1} \quad (4)$$

$$\tilde{l}_{pn} = r_n \tilde{\theta}_n \quad (5)$$

$$l_{pn} = r_n(\tilde{\theta}_n + \tilde{\theta}_{n-1} + \ldots + \theta_1) = r_n \theta_n \quad (6)$$

This indicates that the angle $\theta_n$ of the distal end of the n-th curved section is determined in accordance with only the driven displacement of the wire $l_{pn}$ and not with the angles of the first to the (n−1)th sections.

Next, a relationship between the angle at the distal end of the n-th curved section and coordinates at the distal end is derived. First, the first curving section will be considered. If $\rho$ is defined as a curvature radius, the coordinates ($x_{t1}$, $z_{t1}$) of the distal end of the first curving section are expressed by Expressions (7) and (8). When Expression (2) is substituted into Expressions (7) and (8), Expressions (9) and (10) are given. Here, a relationship between the angle at the distal end and the coordinates at the distal end of the n-th curved section is derived. Here, n is 2 or greater. $x_{tn}$ (x with tilde) and $z_{tn}$ (z with tilde) which are coordinates of the distal end of the curved section in the relative coordinate system $x_n$-$z_n$ are expressed by Expressions (11) and (12).

Therefore, the coordinates ($x_{tn}$, $z_{tn}$) of the distal end in an absolute coordinate system is expressed by Expression (13) by using a rotational transform matrix. In the following section, coordinates for dividing the entire robot into $\alpha$ times are used as evaluation points of an optimization algorithm. The total number of the evaluation points is $c = \alpha e$ and coordinates ($x_i$, $z_i$) of the i-th evaluation point are given by Expression (14). Q is a quotient obtained by $Q=[i/\alpha]$, and R is a remainder obtained by $R=i \bmod \alpha$.

[Math. 2]

$$x_{t1} = \rho_1(1 - \cos\theta_1) \quad (7)$$

$$z_{t1} = \rho_1 \sin\theta_1 \quad (8)$$

$$x_{t1} = \frac{l_1}{\theta_1}(1 - \cos\theta_1) \quad (9)$$

$$z_{t1} = \frac{l_1}{\theta_1}\sin\theta_1 \quad (10)$$

-continued $$\tilde{x}_{tn} = \frac{l_n}{\tilde{\theta}_n}(1 - \cos\tilde{\theta}_n) \quad (11)$$

$$\tilde{z}_{tn} = \frac{l_n}{\tilde{\theta}_n}\sin\tilde{\theta}_n \quad (12)$$

[Math. 3]

$$\begin{bmatrix} X_{tn} \\ Z_{tn} \end{bmatrix} = \begin{bmatrix} X_{t1} \\ z_b + z_{t1} \end{bmatrix} + \sum_{m=2}^{n} \begin{bmatrix} \cos\theta_{m-1} & \sin\theta_{m-1} \\ -\sin\theta_{m-1} & \cos\theta_{m-1} \end{bmatrix} \begin{bmatrix} \frac{l_m}{\tilde{\theta}_m}(1 - \cos\tilde{\theta}_m) \\ \frac{l_m}{\tilde{\theta}_m}\sin\tilde{\theta}_m \end{bmatrix} \quad (13)$$

[Math. 4]

$$\begin{bmatrix} x_i \\ z_i \end{bmatrix} = \begin{bmatrix} \frac{l_1}{\left(\frac{R}{\alpha}\right)\theta_1}\left(1 - \cos\left(\frac{R}{\alpha}\right)\theta_1\right) \\ \frac{l_1}{\left(\frac{R}{\alpha}\right)\theta_1}\sin\left(\frac{R}{\alpha}\right)\theta_1 \end{bmatrix} + \begin{bmatrix} 0 \\ z_i \end{bmatrix} (i < \alpha) \quad (14)$$

$$\begin{bmatrix} x_i \\ z_i \end{bmatrix} = \sum_{n=1}^{Q} \begin{bmatrix} x_{in} \\ z_{in} \end{bmatrix} (i = n\alpha)$$

$$\begin{bmatrix} x_i \\ z_i \end{bmatrix} = \sum_{n=1}^{Q} \begin{bmatrix} x_{in} \\ z_{in} \end{bmatrix} = \begin{bmatrix} \cos\theta_Q & \sin\theta_Q \\ -\sin\theta_Q & \cos\theta_Q \end{bmatrix}$$

$$\begin{bmatrix} \frac{l_{Q+1}}{\left(\frac{R}{\alpha}\right)\tilde{\theta}_{Q+1}}\left(1 - \cos\left(\frac{R}{\alpha}\right)\tilde{\theta}_{Q+1}\right) \\ \frac{l_{Q+1}}{\left(\frac{R}{\alpha}\right)\tilde{\theta}_{Q+1}}\sin\left(\frac{R}{\alpha}\right)\tilde{\theta}_{Q+1} \end{bmatrix} + \begin{bmatrix} 0 \\ z_b \end{bmatrix}$$

$$(i = n\alpha + 1, \ldots, n\alpha + \alpha - 1)$$

(1.2 Kinematic Model Modification by Adjacent Sections Continuity Models)

In the preceding section, a kinematic model is derived based on the assumptions of 1 to 6, however, the housing and the wire of a robot which is flexible in the curving direction and highly rigid in the longitudinal direction are difficult in a structural design, and thus assumptions 3 and 4 are hardly satisfied actually. Therefore, the relational expression (6) of the curving angle with respect to the driven displacement of the wire does not hold, and a difference will be produced between the actual curving angle after control and the target angle. This influence may cause a difference in the curving angle not only in the curved section in which the wire is driven, but also in other sections, and may produce a continuity issue. Then, in the present embodiment, assumptions related to the continuity of the curved sections are added and a difference in the kinematic model is modified.

In the present embodiment, the following assumption related to the continuity of the curved sections is added and the difference in the kinematic model is modified.

7. When a single curved section is driven, continuity occurs in all the curved sections.

These Expressions can be expressed as a matrix by Expression (15) which is defined as a modification matrix $\Gamma$ in the present embodiment. Therefore, coordinates ($x_{gtn}$, $z_{gtn}$) of each of the distal ends of the curved sections to be modified are expressed by Expression (16).

[Math 5]

$$\begin{bmatrix} \tilde{\theta}_{g1} \\ \tilde{\theta}_{g2} \\ \vdots \\ \tilde{\theta}_{gn} \\ \vdots \\ \tilde{\theta}_{ge-1} \\ \tilde{\theta}_{ge} \end{bmatrix} = \Gamma \begin{bmatrix} \tilde{\theta}_1 \\ \tilde{\theta}_2 \\ \vdots \\ \tilde{\theta}_n \\ \vdots \\ \tilde{\theta}_{e-1} \\ \tilde{\theta}_e \end{bmatrix} \quad (15)$$

[Math 6]

$$\begin{bmatrix} x_{gm} \\ z_{gm} \end{bmatrix} = \begin{bmatrix} x_{g1} \\ z_b + z_{g1} \end{bmatrix} + \sum_{m=2}^{n} \begin{bmatrix} \cos\tilde{\theta}_{gm-1} & \sin\tilde{\theta}_{gm-1} \\ -\sin\tilde{\theta}_{gm-1} & \cos\tilde{\theta}_{gm-1} \end{bmatrix} \begin{bmatrix} \frac{l_m}{\tilde{\theta}_{gm}}(1-\cos\tilde{\theta}_{gm}) \\ \frac{l_m}{\tilde{\theta}_{gm}}\sin\tilde{\theta}_{gm} \end{bmatrix} \quad (16)$$

More specific examples will be given. When driving the n-th curved section to the curving angle $\theta_n$ (θ with tilde), the following continuity occurs. That is, the curving angles in the (n−1)th curved section and the (n+1)th curved section increase by $\gamma_{pn}*(\theta_n)$ (θ with tilde) and $\gamma_{dn}*(\theta_n)$ (θ with tilde), respectively, and the curving angle in the n-th curved section reduces by $(\gamma_{pn}+\gamma_{dn})*(\theta_n)$ (θ with tilde). Here, $\gamma_{pn}$ and $\gamma_{dn}$ are modification coefficients of positive numbers. That is, an angle obtained by multiplying the curve relative angle in the i-th curvable portion by a coefficient $\gamma_{p[i]}$ is added to the curve relative angle in the adjacent (i−1)th curvable portion. Further, an angle obtained by multiplying the curve relative angle in the i-th curvable portion by another coefficient $\gamma_{d[i]}$ is added to the curve relative angle in the adjacent (i+1)th curvable portion, and an angle obtained by multiplying the curve relative angle in the i-th curvable portion by $(\gamma_{p[i]}+\gamma_{d[i]})$ is subtracted from the curve relative angle in the i-th curvable portion. A modification value is obtained by using such a model (here, i is 2 or greater and equal to or smaller than (the number of curvable portions)−1). When these are expressed as a matrix, in the modification matrix Γ, i-th row, i-th column is defined as $1-\gamma_{d[i]}-\gamma_{p[i]}$, i-th row, (i−1)th column is defined as $\gamma_{d[i-1]}$, and i-th row, (i+1)th column is defined as $\gamma_{p[i+1]}$.

In coordinates $(x_{gi}, z_{gi})$ of the i-th evaluation points for dividing the entire robot into α times, θ and θ (θ with tilde) may be substituted by $\theta_g$ and $\theta_g$ (θ with tilde), respectively, in Expression (14). Therefore, description thereof will be omitted.

(1.3 Optimization of Modification Coefficient)

It is difficult to analytically obtain the kinematic model modification matrix described in the preceding section. This is because continuity of the curving angles is caused due to deformation of the housing and the wires by compression and tension force in the longitudinal direction, however, the compression and tension force varies due to different numbers of the wires passing in each of the curved sections, or rigidity of the housing nonlinearly varies depending on the curving angles. Further, the assumptions 1, 2, 5, and 6 are not completely satisfied, and which may cause of a difference of the curving angle. Then, in the present embodiment, the curved shape is experimentally measured and the modification matrix Γ is obtained from a difference between a measurement value and the kinematic model by using the steepest descent method which is an approach of optimization. Since it is not able to select one suitable curved shape for optimization of the modification matrix Γ, a types of representative shapes are selected from the branched trajectory and optimization is performed by iterating h times in the present embodiment. This approach is referred to as an extended steepest descent method.

An algorithm of the extended steepest descent method is illustrated in FIG. 8 above as a block diagram. The reference symbols in the block diagram are defined as follows: $T_{ra}$ denotes a branched trajectory, and Extractor block denotes a block for extracting an unbranched trajectory from a branched trajectory. $T_{ra1}$ to $T_{rab}$ denote extracted b unbranched trajectories. A Fit block optimizes a target angle for performing head end tracking control with respect to each unbranched trajectory. Further, a Fit block is a block for selecting a curve target angle $\theta_{ref_k}$ for optimization of a modification matrix Γ from a curve target angle matrix $\Theta_{ref}$ as a representative shape. Detailed procedure of the Extractor block and the Fit block will be described in the following section. When an end point of a trajectory is selected as a representative shape, a curved shape near the end point can be precisely modified. In order to improve a curved shape near an intermediate portion of the trajectory, a curve target angle near the intermediate portion of the trajectory may be added as a representative shape.

The reference symbol $_{[k]}$ denotes a k-th (which is equal to or smaller than a) representative shape, and $_j$ denotes a j-th (which is equal to or smaller than h) iterative trial. A k-th representative shape vector $\theta_{rep[k]}$ is expressed by Expression (17), driven displacement of the wire $l_{p[k]}$ with respect to the k-th representative shape is expressed by Expression (18), and measurement displacements $X_{ex[k]}$ and $Z_{ex[k]}$ of the robot is expressed by Expression (19), respectively. SDM denotes a steepest descent method algorithm and is a block for obtaining a modification coefficient vector $\gamma_{[k]j}$ which minimizes an evaluation function expressed by Expression (21) through optimization. A modification matrix $\Gamma_{[k]j}$ is a modification matrix of the iteration number j with respect to the k-th representative shape.

As described above, in order to obtain the modification matrix Γ by the extended steepest descent method by using these blocks, first, the first representative shape vector $\theta_{ref[1]}$ is set and the driven displacement of the wire $l_{p[1]}$ is obtained by the wire displacement block K which operates Expression (6). Next, the robot P is controlled by applying the driven displacement of the wire, and measurement displacement $X_{ex[1]}$ and $Z_{ex[1]}$ of the curved shape of the robot are obtained. The modification matrix $\Gamma_{[1]1}$ with respect to the first representative shape is obtained by the steepest descent method operation block SDM by using these measurement displacements, the representative shape $\theta_{rep[1]}$, and the initial matrix $\Gamma_0$ of the modification matrix. Next, a modification matrix Γ[2]1 with respect to a second representative shape is obtained in the same manner. In the present embodiment, the modification matrix $\Gamma_{[1]1}$ obtained with respect to the first representative shape is used as an initial value of the steepest descent method with respect to the second representative shape. This avoids setting of the modification matrix to a local minimum value. Then, as illustrated in FIG. 8, a modification matrix $\Gamma_{[k]1}$ is obtained for each of the a types of representative shapes. The aforementioned procedure is the first iterative trial. Next, a second iterative trial is performed, in which an initial value of a modification matrix is defined as the modification matrix obtained in the first iterative trial. Thus, the second trial is performed in the same manner as the first trial. The trial is iterated h times and it is determined in a block CJB whether the modification matrix is sufficiently converged. Alternatively, the iteration number may be determined by trial and difference in advance. A mean value of all the modification matrices is obtained by Expression (22) and the obtained mean value is defined as a modification matrix Γ.

[Math. 7]

$$\theta_{rep[k]} = [\theta_{rep1[k]} \; \theta_{rep2[k]} \; \cdots \; \theta_{repe[k]}]^T \quad (17)$$

$$l_{p[k]} = [l_{p1[k]} \; l_{p2[k]} \; \cdots \; l_{pe[k]}]^T \quad (18)$$

$$x_{ex[k]} = [x_{ex1[k]} \; x_{ex2[k]} \; \cdots \; x_{exe[k]}]^T \quad (19)$$

$$z_{ex[k]} = [z_{ex1[k]} \; z_{ex2[k]} \; \cdots \; z_{exe[k]}]^T \quad (20)$$

[Math. 8]

$$\sum_{i=1}^{c} \sqrt{(x_{exi[k]} - x_{gi})^2 + (z_{exi[k]} - z_{gi})^2} \quad (21)$$

$$\Gamma = \frac{1}{ah} \sum_{j=1}^{h} \sum_{k=1}^{a} \Gamma_{[k]j} \quad (22)$$

(2. Control System Design)

In this section, a method for extracting an unbranched trajectory from a branched trajectory expressed by an Extractor block in an extended optimization algorithm of FIG. 8 is first described, and then a target angle optimization method for head end tracking control with respect to the unbranched trajectory expressed by a Fit block is described. Next, a compensation method for a curving angle control by using an inverse matrix $\Gamma^{-1}$ of a modification matrix Γ obtained by the extended optimization algorithm is described.

(2.1 Extract Unbranched Trajectory from Branched Trajectory)

Figure 7A:
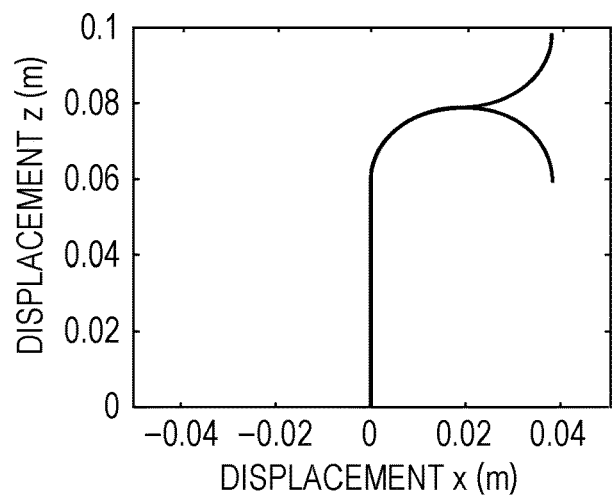
FIG. 7A illustrates trajectory extraction according to the first embodiment.
Figure 7B:
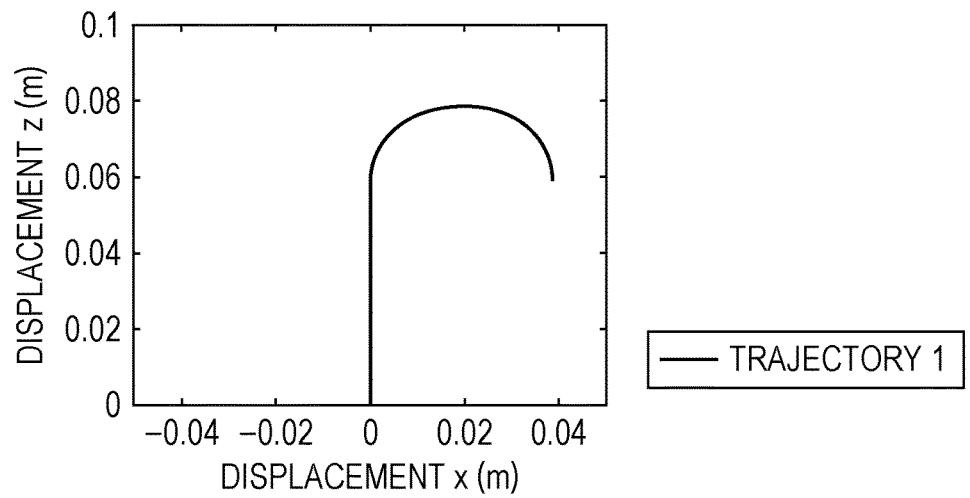
FIG. 7B illustrates trajectory extraction according to the first embodiment.
Figure 7C:
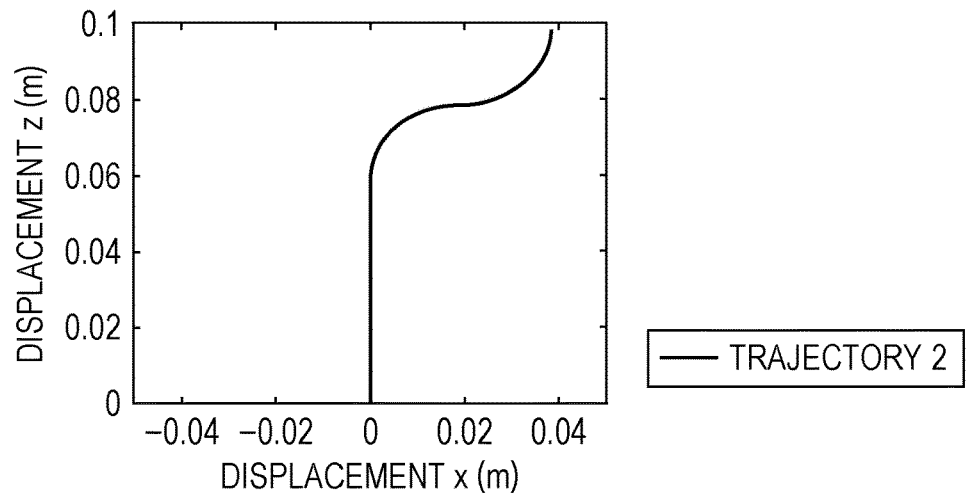
FIG. 7C illustrates trajectory extraction according to the first embodiment.

In order to perform head end tracking control with respect to a branched trajectory, in the present embodiment, b unbranched trajectories are extracted from a branched trajectory which has b end points. Here, each of the extracted unbranched trajectories includes a common portion of each of the unbranched trajectories, and includes a tangent portion added in the preceding section. As an example, a two-branched trajectory is illustrated in FIG. 7A. Two unbranched trajectories are extracted from this two-branched trajectory. FIG. 7B illustrates a first unbranched trajectory and FIG. 7C illustrates a second unbranched trajectory.

(2.2 Optimization of Target Angle of Head End Tracking Control)

A method for target angle optimization with respect to an unbranched trajectory is described in this section. It is not necessary in the head end tracking control that the trajectory is defined in advance, however, the curving angle of the most distal end may be continuously propagated to a subsequent curved section with a time difference. However, if the entire trajectory is defined in advance as depicted by the broken lines in FIG. 1, the curved shape can be optimized depending on the displacement in the z direction of the base. This can reduce a trajectory difference in the continuum robot as compared with the head end tracking control in which the curving angle is propagated. The procedure will be described below.

Figure 6:
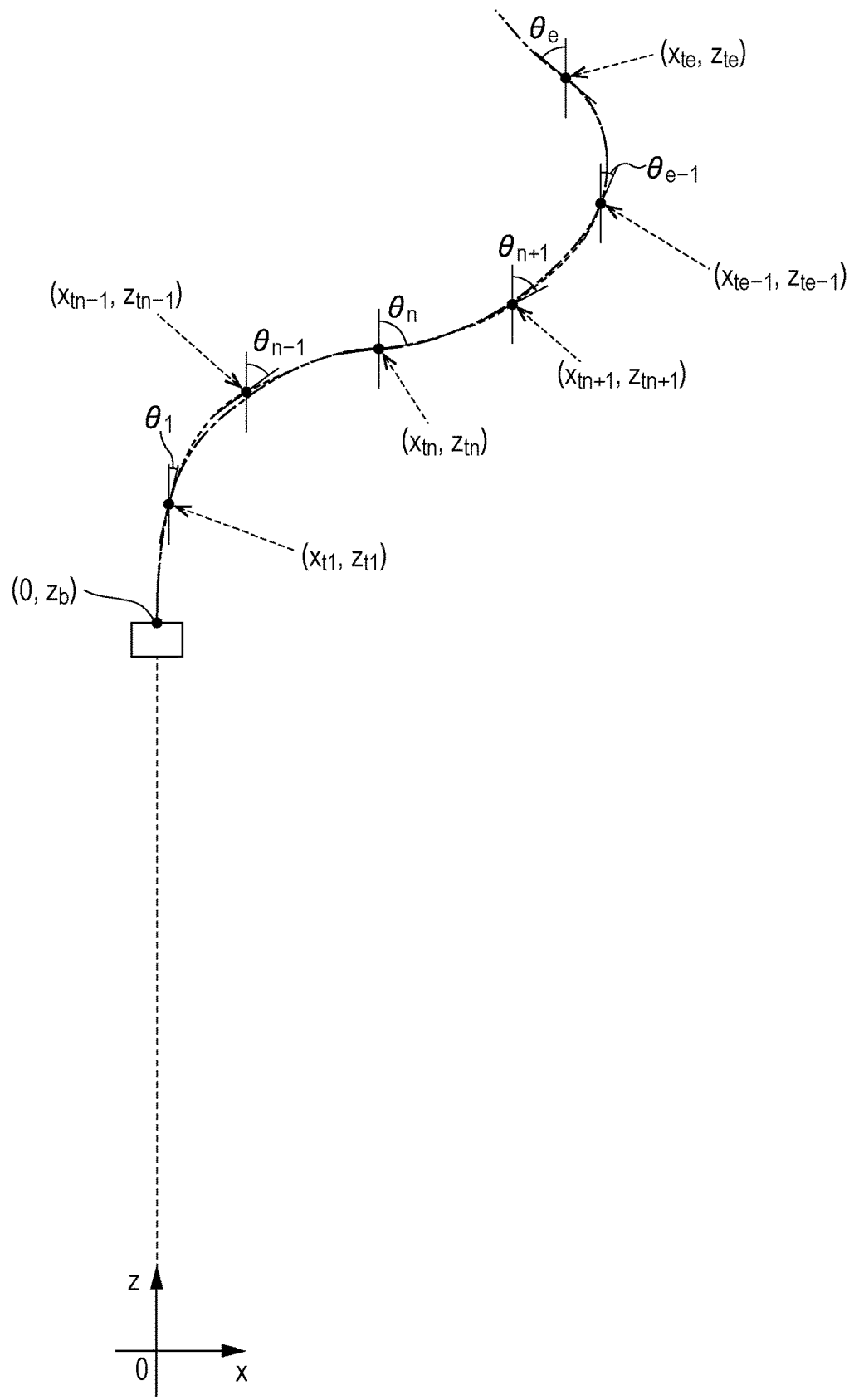
FIG. 6 illustrates a kinematic model according to the first embodiment.

In the present embodiment, as depicted by the dash-dot line in FIG. 6, an example in which the trajectory is the same as the total length of the robot will be described. First, as depicted by the broken line in FIG. 6, a tangent is added to a proximal end of the trajectory and an origin point of the coordinate system is established at the termination thereof. The length of the tangent may be set to the same as that of the total length of the robot. Hereinafter, in the present embodiment, the added tangent and the trajectory are referred to as an entire trajectory. Next, the entire trajectory is divided into 2c equal parts by constant velocity spline interpolation, for example, and trajectory evaluation points $P_1$ ($x_{tr1}$, $z_{tr1}$) to $P_{2c}$ ($x_{tr2c}$, $z_{tr2c}$) are set at the divided nodes. In the head end tracking control, the displacement of the base is started from $z_b = z_{tr1} = 0$ m, and is completed at $z_b = z_{trc} = nl$ m.

In order to obtain the curved shape of the continuum robot which conforms to the entire trajectory as the base moves forward, the following procedure is taken. First, the c trajectory evaluation points are extracted from the entire trajectory with a trajectory evaluation point $P_\zeta$ ($\zeta$ is greater than 1 and equal to or smaller than c) as a start point. In order to set the curved shape of the continuum robot to be asymptotic to these trajectory evaluation points, the sum of each distance may be minimized by using an evaluation function (Expression (23)) by using c evaluation points on the robot expressed by Expression (14). In the present embodiment, a curving angle target value vector $\theta_{ref}$ which implements the coordinates ($x_i$, $z_i$) is defined as Expression (24) with the target angle $\theta_{refn}$ with respect to the n-th curved section as a component.

If a curve target angle when the base is at the $\zeta$-th trajectory evaluation point $P_\zeta$ is defined as $\theta_{ref\zeta}$, a curve target angle matrix $\Theta_{ref}$ (which is expressed by Expression (25)) of e-th row, c-th column may be obtained for the head end tracking control.

Since the number of the curved sections is limited, the evaluation function of Expression (23) does not necessarily become 0 in some trajectories. Then, a difference between the shape of the curving angle target value obtained through optimization and the shape of the entire trajectory is defined as a mechanical difference, and a difference between the curving angle target value and the curving angle controlled by the wire driving is defined as a controlled difference. With respect to the p-th (p is equal to or smaller than b) unbranched trajectory extracted in this procedure, the curve target angle matrix obtained through optimization is defined as $\Theta_{refp}$. If the entire trajectory is shorter than the robot, the curving angle target value can be generated by using the above-described algorithm by (1) extending the tangent to be added to the most proximal end, or (2) adding the tangent to the distal end. That is, in (1), the length of the tangent to be added to the most proximal end of the trajectory may be set to (the total length of the robot+the total length of the robot−the length of the trajectory). In (2), the tangent may be added to the distal end of the trajectory and set the length to (the total length−length of the trajectory of the robot). In (2), the head end tracking control needs to be completed at the coordinates at which the displacement of the base becomes equal to the length of the trajectory.

[Math. 9]

$$\sum_{i=1}^{c} \sqrt{(x_{trl\zeta+i]} - x_i)^2 + (z_{trl\zeta+i]} - z_i)^2} \quad (23)$$

$$\theta_{ref} = [\theta_{ref1} \; \theta_{ref2} \; \ldots \; \theta_{refe}]^T \quad (24)$$

$$\theta_{ref} = [\theta_{ref1} \; \ldots \; \theta_{ref\zeta} \ldots \theta_{refc}] = \begin{bmatrix} \theta_{ref11} & \cdots & \theta_{ref1c} \\ \vdots & \ddots & \vdots \\ \theta_{refe1} & \cdots & \theta_{refec} \end{bmatrix} \quad (25)$$

(2.3 Head End Tracking Control with Respect to Branched Trajectory)

Figure 9:
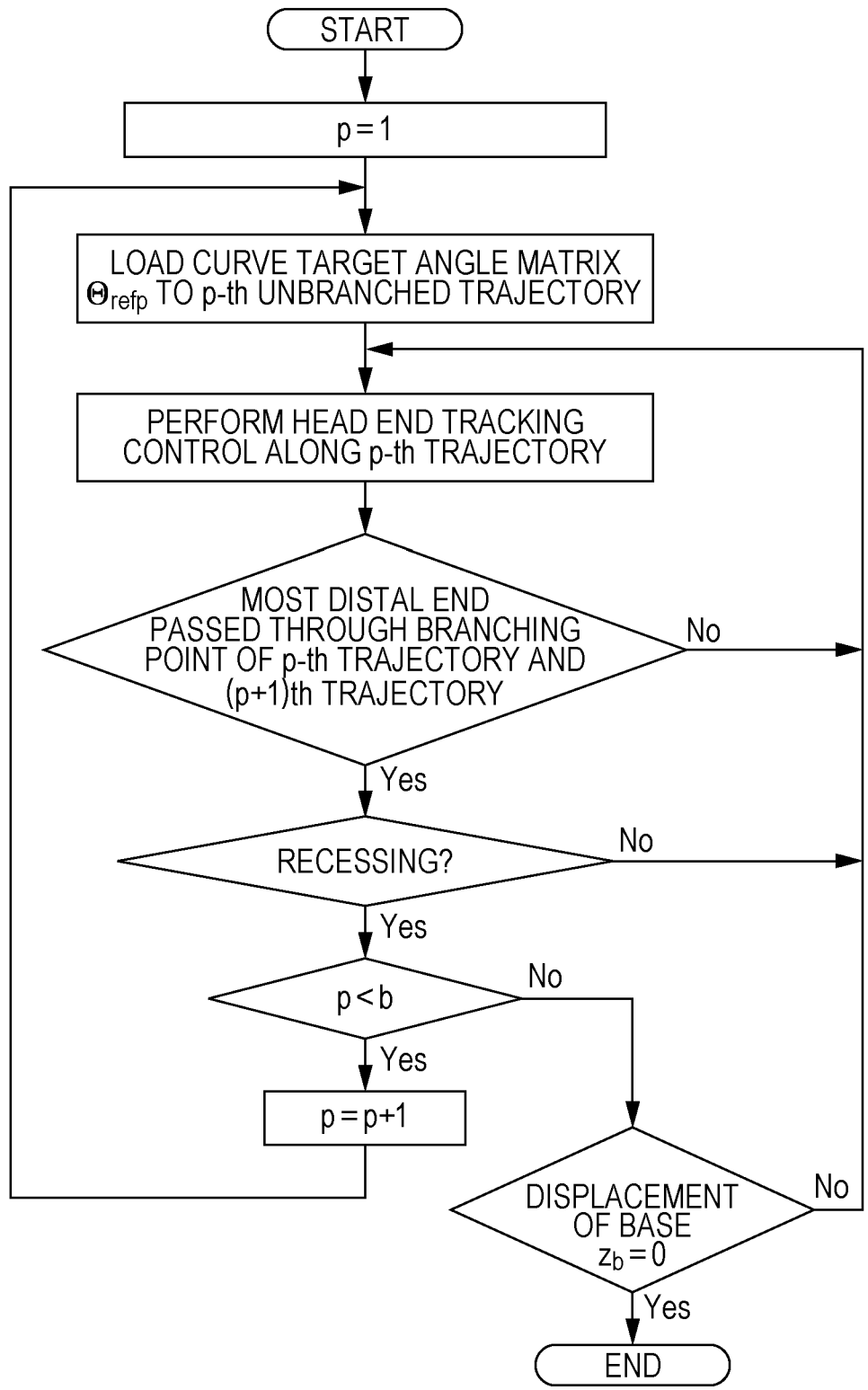
FIG. 9 is a control flow diagram according to the first embodiment.

A procedure to extract an unbranched trajectory from a branched trajectory is described in section 2.1, and a curving angle target value to perform head end tracking control with respect to the unbranched trajectory is derived in section 2.2. Next, a flow for performing head end tracking control with respect to the branched trajectory so that the most distal ends sequentially reach the end points is illustrated in FIG. 9. First, p is set to p=1, and a curve target angle matrix $\Theta_{refp}$ with respect to the p-th unbranched trajectory is loaded, and head end tracking control is performed. Then when the most distal end passes through a branching point of the p-th trajectory and the (p+1)th trajectory, and a speed of a displacement of the base $z_b$ is negative, p is set to p=p+1, and the head end tracking control with respect to a subsequent unbranched trajectory is started. In that case, it is necessary to be p<b. If p=b, it is determined that the most distal end has passed through all the branching points, the control is completed as soon as the base returns to its origin point. In this flow, an operator may arbitrarily operate the displacement of the base, or the base may be driven by a motor and an operation thereof may be set in advance.

(2.4 Application to Control System of Modified Kinematic Model)

A kinematic model modification matrix Γ obtained by the extended steepest descent method described in section 1.3 is applicable not only to modification of a kinematic model of a robot, and calculation of a curved shape thereof, but also to head end tracking control. First, a target curved shape vector $\theta_{refζ}$ is extracted from the curve target angle matrix $\Theta_{refp}$ obtained in the preceding section depending on the displacement of the base $z_b$ in the p-th unbranched trajectory. Next, a modification curved shape vector $\theta_{mod}$ consisting of a modification target angle $\theta_{modn}$ with respect to the n-th curved section is defined by Expression (26). Then, in order to control the robot into the target curved shape, the modification curved shape vector may be obtained as expressed by Expression (27) by using the inverse matrix of the modification matrix Γ.

Figure 10:
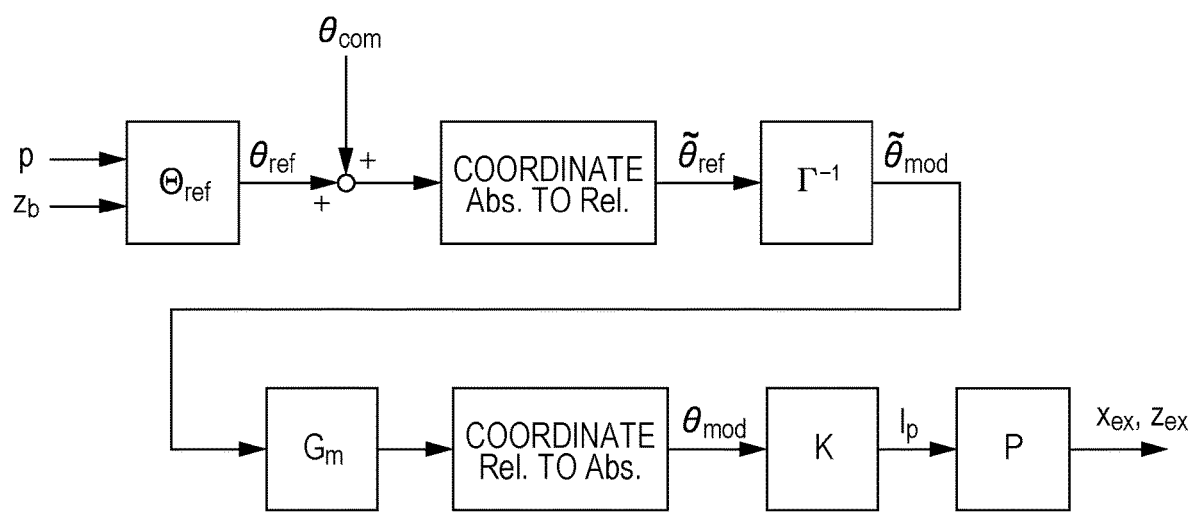
FIG. 10 is a block diagram illustrating a control system according to the first embodiment.

The modification target angle is converted into an absolute coordinate system, and is substituted into the angle θ of Expression (6) to obtain the driven displacement of the wire. In the control system of the present embodiment, the kinematic model modification is applicable to control not only the previously set curved shape, but also the curved shape by real-time operation by adding an additional target vector $\theta_{com}$ of the curved shape to the target curved shape vector. A block diagram of the control system is illustrated in FIG. 10.

[Math. 10]

$$\theta_{mod} = [\theta_{mod\,1} \; \theta_{mod\,2} \; \ldots \; \theta_{mod\,e}]^T \quad (26)$$

$$\tilde{\theta}_{mod} = \Gamma^{-1} \tilde{\theta}_{ref} \quad (27)$$

(3 Experiment)

In this section, the effectiveness of the kinematic model modification algorithm with respect to the branched trajectory will be described. Parameters of the robot used in the experiment are the lengths of the arm housing $l_1$ to $l_6$=0.010 m, and the number of curved sections of the robot e=6. The displacement from the central axis of the arm housing to the wire in the n-th curved section is $r_1 = r_3 = 1.32 \times 10^{-3}$ m, $r_2 = r_4 = -1.32 \times 10^{-3}$ m, $r_5 = 1.4 \times 10^{-3}$ m, and $r_6 = -1.4 \times 10^{-3}$ m.

Figure 11:
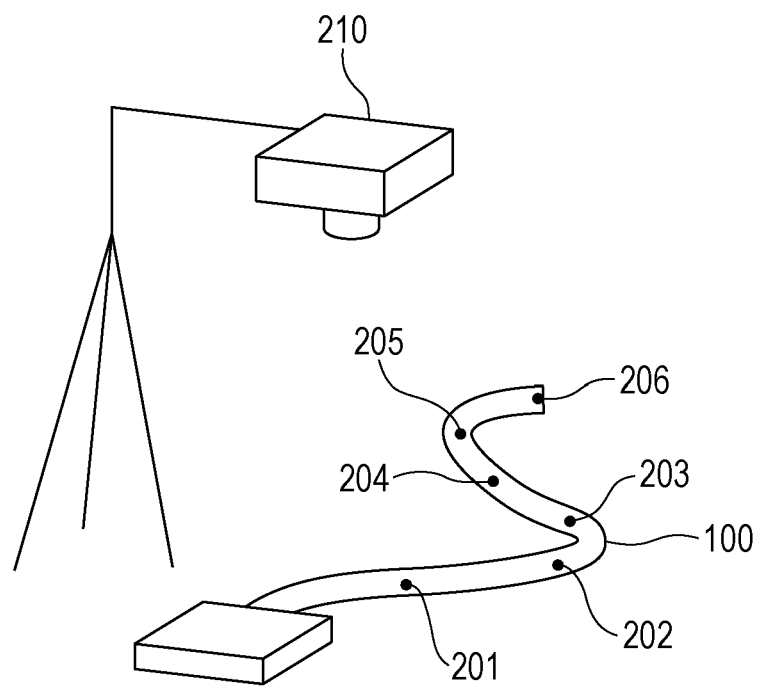
FIG. 11 illustrates a displacement measurement apparatus according to the first embodiment.

In the experiment, as illustrated in FIG. 11, markers 201 to 206 are provided at the distal ends in the curved sections of the continuum robot 100, and displacement of the distal ends in each of the curved sections (Expression (28)) is obtained by an image pickup device 210. In the extended steepest descent method, the evaluation point c is defined as c=60. Therefore, the evaluation points other than the distal ends in the curved sections are obtained by interpolation based on the assumption that the curved sections have a constant curvature. As representative curved positions, a position of the first unbranched trajectory in the end point illustrated in FIG. 7B and a position of the second unbranched trajectory in the end point illustrated in FIG. 7C are selected and expressed by Expressions (29) and (30), respectively.

Figure 12:
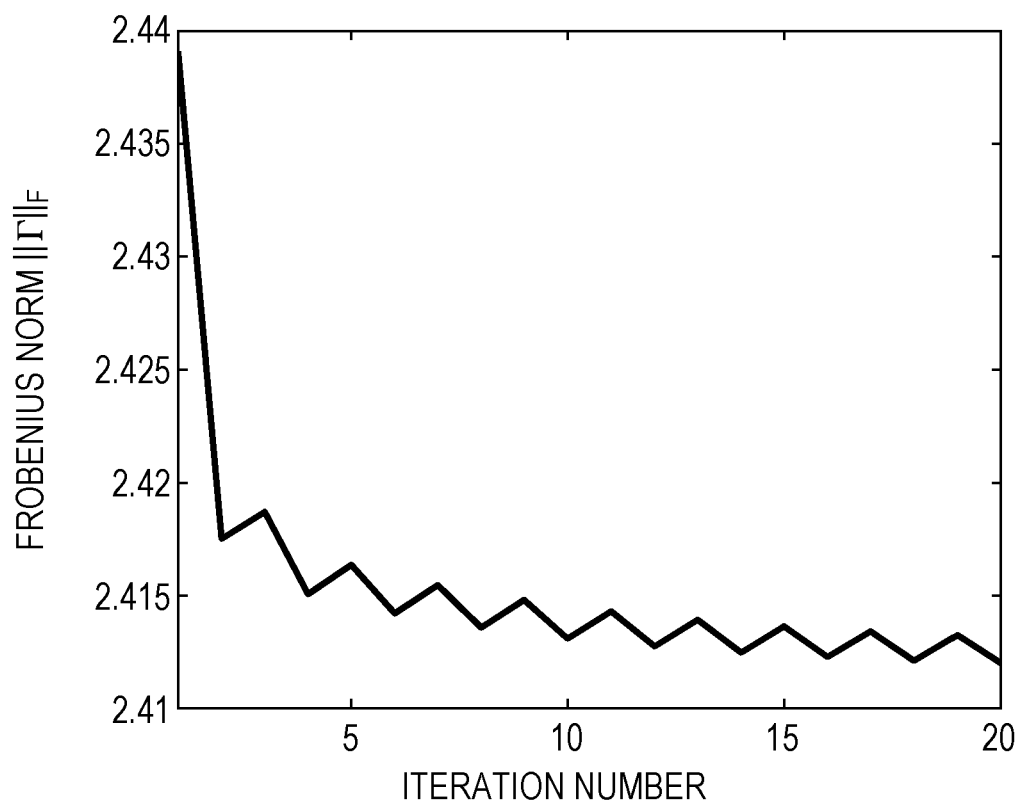
FIG. 12 illustrates the Frobenius norm according to the first embodiment.

In the extended steepest descent method algorithm, the iteration number h is set to h=10. FIG. 12 illustrates a response of the Frobenius norm through optimization of the modification matrix Γ with respect to the number of iterative trial times by the extended steepest descent method algorithm described in section 1.3. The response is vibratory, however, is converting, and the modification matrix is optimized by iteration.

Figure 13A:
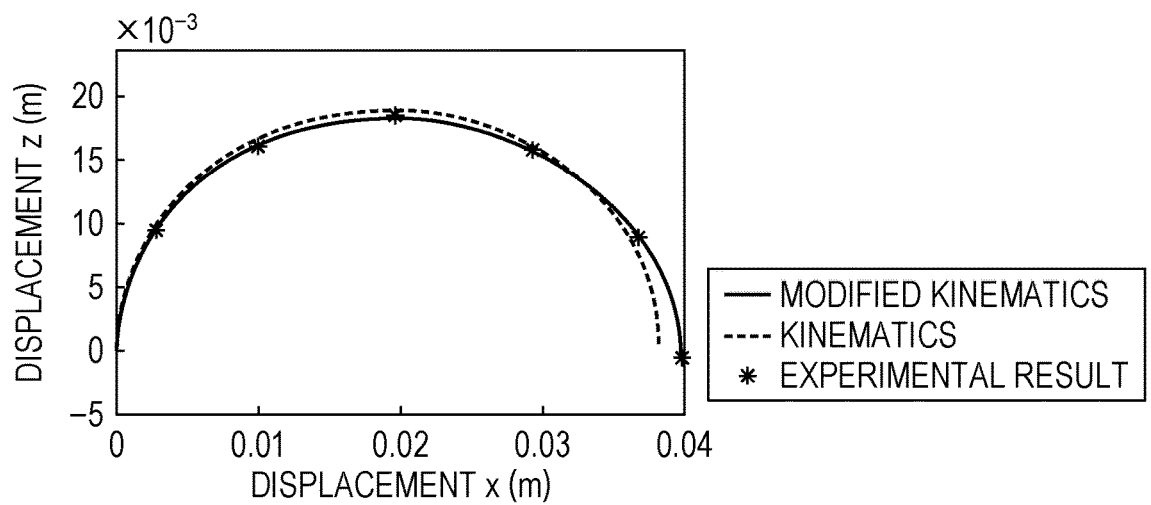
FIG. 13A illustrates an experimental result according to the first embodiment.
Figure 13B:
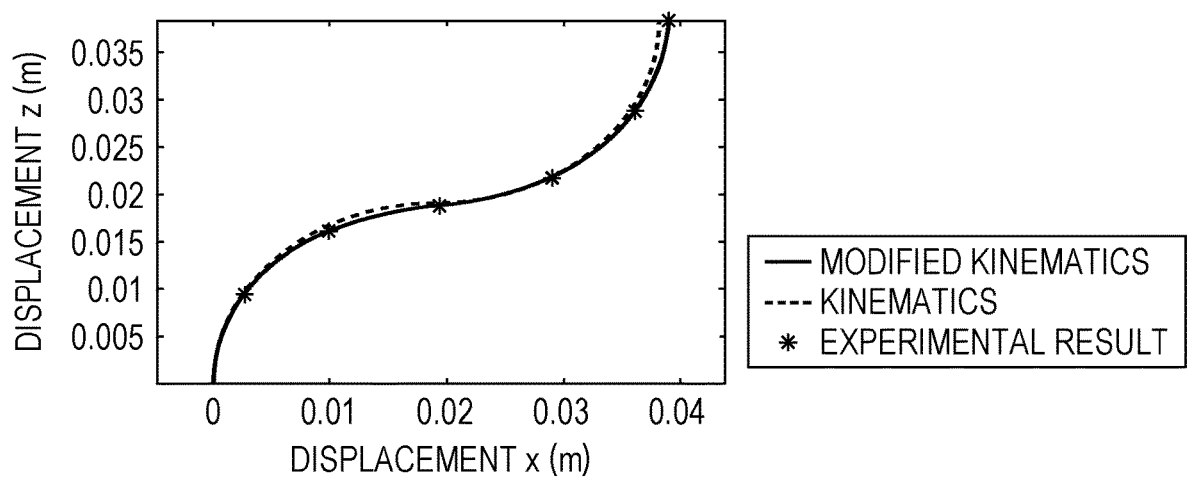
FIG. 13B illustrates an experimental result according to the first embodiment.

First, a response of the kinematic model modification of the position of the first unbranched trajectory in the end point selected as the representative shape is illustrated in FIG. 13A, and a response of the kinematic model modification of the position of the second unbranched trajectory in the end point selected as the representative shape is illustrated in FIG. 13B. The response by the modified kinematic model is depicted by the solid line, the displacement of the distal end of the curved section measured by the experiment is depicted by the asterisk, and the response of the kinematic model before modification is depicted by the broken line for the comparison. FIGS. 13A and 13B indicate that although a difference is caused between the experimental response and the response of an unmodified kinetic model derived based on the assumptions 1 to 6 of section (1.1), the difference with respect to the experimental response can be reduced by modifying the kinematic model which optimizes the modification matrix Γ by using the experimental response.

Figure 14A:
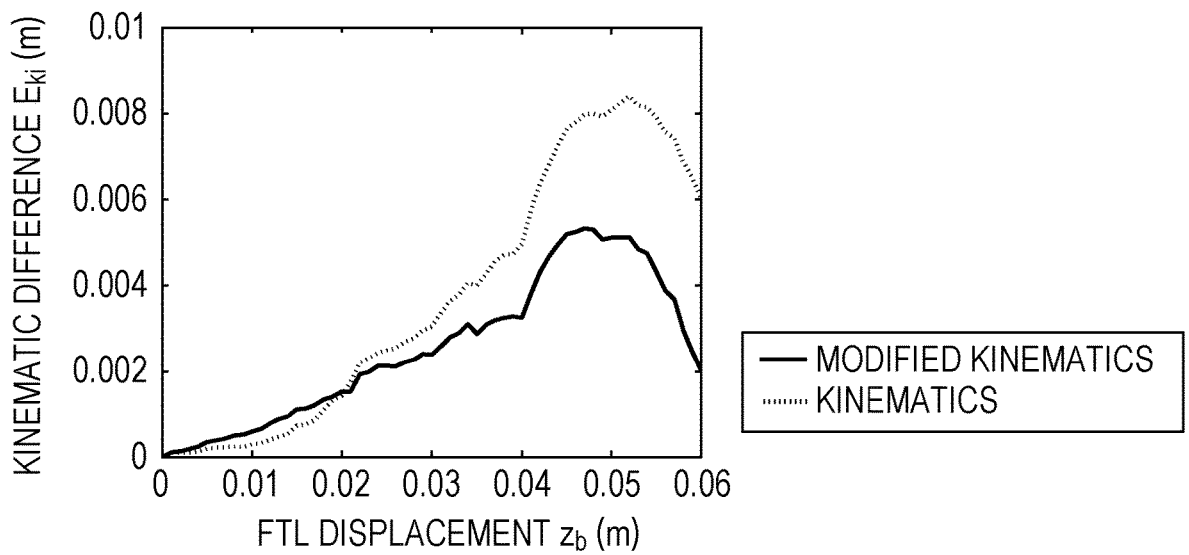
FIG. 14A illustrates an experimental result according to the first embodiment.
Figure 14B:
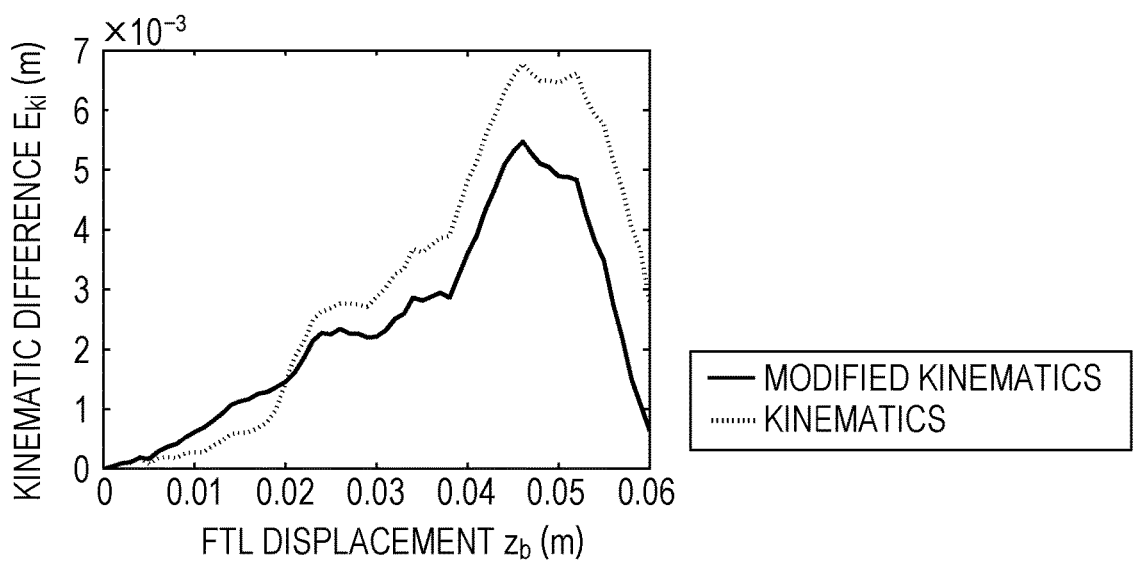
FIG. 14B illustrates an experimental result according to the first embodiment.

Next, a response of the head end tracking control with respect to the first unbranched trajectory illustrated in FIG. 7B is illustrated in FIG. 14A, and a response of the head end tracking control with respect to the second unbranched trajectory illustrated in FIG. 7C is illustrated in FIG. 14B. A difference response between the curved shape by the experiment and the curved shape by the kinematic model is illustrated. In this section, since the kinematic model modification is verified, compensation by the modification matrix $\Gamma^{-1}$ is not performed with respect to the head end tracking control. In the present embodiment, the kinematic difference between the curved shapes by the experiment and the shapes by the kinematic model in the displacement of the base $z_b$ is defined as the sum of the differences of the displacement of the distal ends of the curved sections expressed by Expression (31).

[Math 11]

$$x_{ed} = [x_{ed1} \ldots x_{ed6}]^T, z_{ed} = [z_{ed1} \ldots z_{ed6}]^T \qquad (28)$$

$$\theta_{rep[1]} = \left[\frac{\pi}{6}\frac{\pi}{6}\frac{\pi}{6}\frac{\pi}{6}\frac{\pi}{6}\frac{\pi}{6}\right]^T \qquad (29)$$

$$\theta_{rep[2]} = \left[\frac{\pi}{3}\frac{2\pi}{3}\frac{\pi}{3}0\frac{\pi}{3}\frac{2\pi}{3}\right]^T \qquad (30)$$

$$E_{ki}(z_b) = \sum_{n=1}^{6} \sqrt{(x_{gtn} - x_{edn})^2 + (z_{gtn} - z_{edn})^2} \qquad (31)$$

A difference by the kinematic model using a modification matrix $\Gamma$ obtained by the extended steepest descent method is depicted by the solid line, and an unmodified kinematic difference for the comparison is depicted by the dotted line. Both of FIGS. 14A and 14B illustrate that the response by the modification matrix $\Gamma$ reduces the kinematic difference in the section of the displacement of the base $z_b$=0.02 m to 0.06 m of the head end tracking control as compared with the response by the unmodified kinematic model. Since the position of the trajectory in the end point is selected as the representative shape, it is indicated that a ratio of a difference reduction increases as displacement of the base proceeds. In the present embodiment, since precision in the endpoint of the trajectory is generally considered to be important in the head end tracking control, the position of the trajectory in the end point is selected as the representative shape. As described above, in the head end tracking control with respect to the two-branched trajectory, 120 types of target angles are generated. It is indicated that the kinematic difference can be reduced in about 80% of sections of the entire trajectories by selecting only two types of representative shapes from among the 120 types of the target angles. In order to reduce the kinematic difference while considering the kinematic difference in the middle of the trajectory as important, the curved position in any base coordinates may be added as a representative shape. This indicates that the modification coefficient optimization algorithm by the extended steepest descent method in the present embodiment is effective to the kinematic model modification accompanied by the head end tracking control.

According to the present disclosure, a difference with respect to a target position of a curvable portion of a continuum robot can be reduced by modifying a driving amount of an actuator obtained when data of the target position of the curvable portion of the continuum robot which should move forward substantially along a branched trajectory is provided. In particular, several points in the branched trajectory are selected and a coefficient of a model for modifying the kinematic model of the continuum robot is calculated by using the optimization algorithm. Then, a difference from the target trajectory can be reduced by improving a control system related to a driving amount of an actuator by using the modification coefficient. With this algorithm, since a difference in the entire trajectory can be reduced by using a part of the trajectory, time and storage capacity needed for modification of the trajectory difference are reduced.

Second Embodiment

In a second embodiment, control performance of head end tracking control with respect to a trajectory which has a space is improved. When a trajectory has a space, observation and operation of a wall surface within the space may be performed. In that case, a curved shape of a robot which can be taken within the space is various, and preparing a modification table of curving angles for all the positions is not practical because a data amount becomes very large, for example. Operations like observation are performed by an operator in real time in many cases, and thus cannot be performed by table modification. Then, in the second embodiment, an optimization technique illustrated in FIG. 8 of the first embodiment is applied to a trajectory which has a space.

Figure 15A:
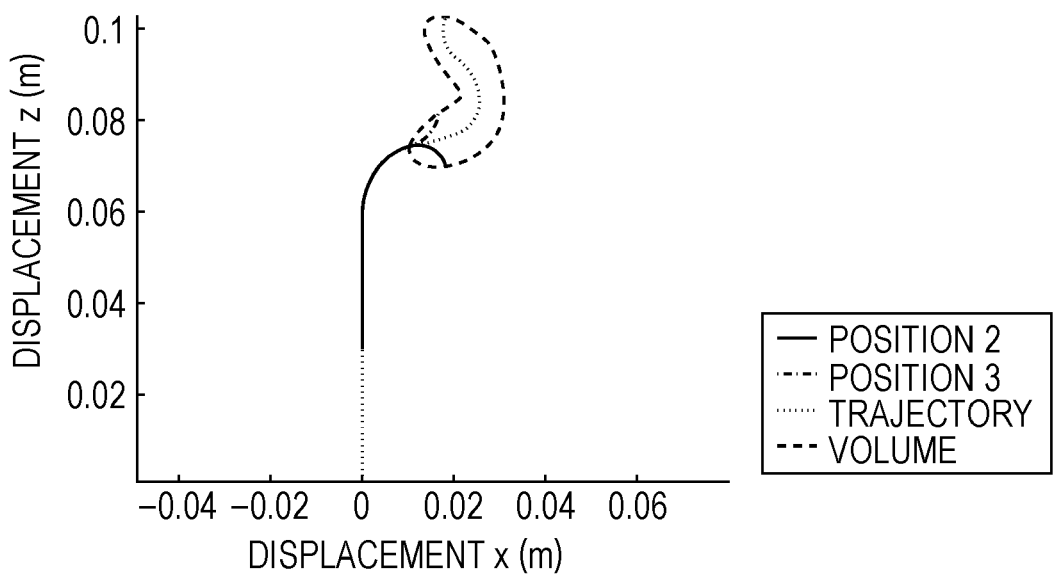
FIG. 15A illustrates trajectory extraction according to a second embodiment.
Figure 15B:
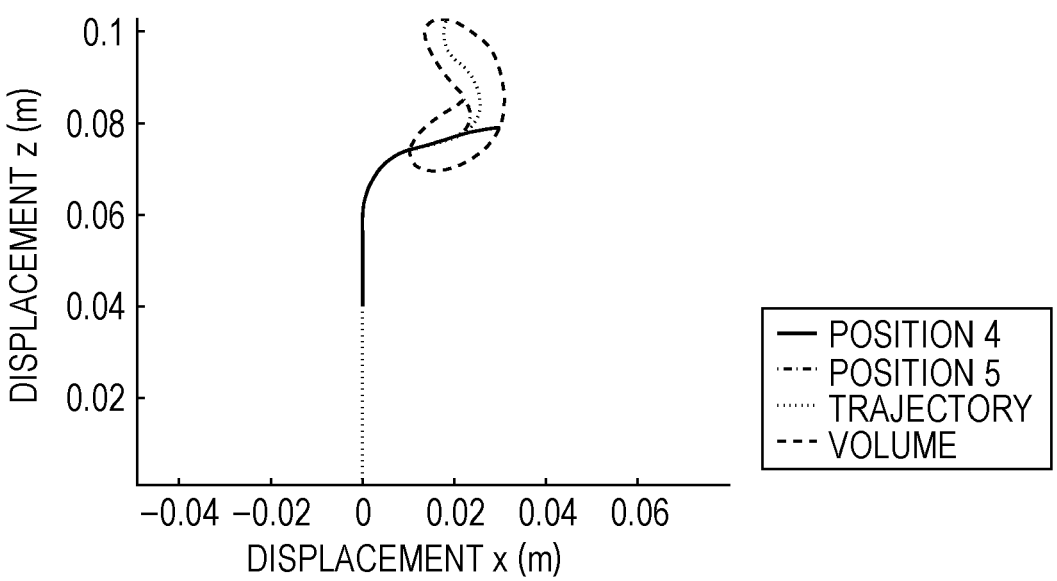
FIG. 15B illustrates trajectory extraction according to the second embodiment.
Figure 15C:
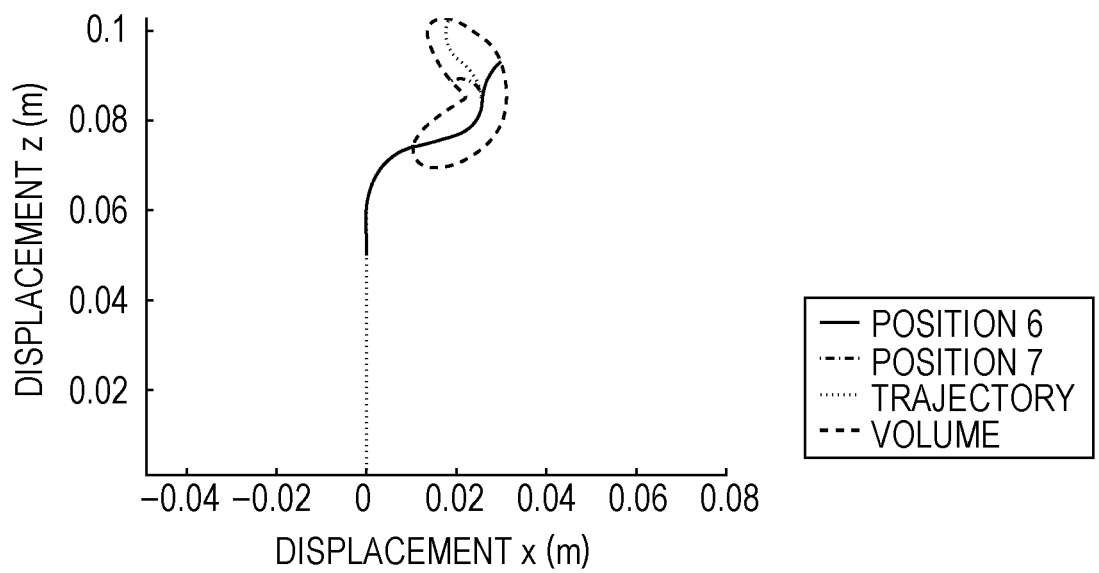
FIG. 15C illustrates trajectory extraction according to the second embodiment.
Figure 15D:
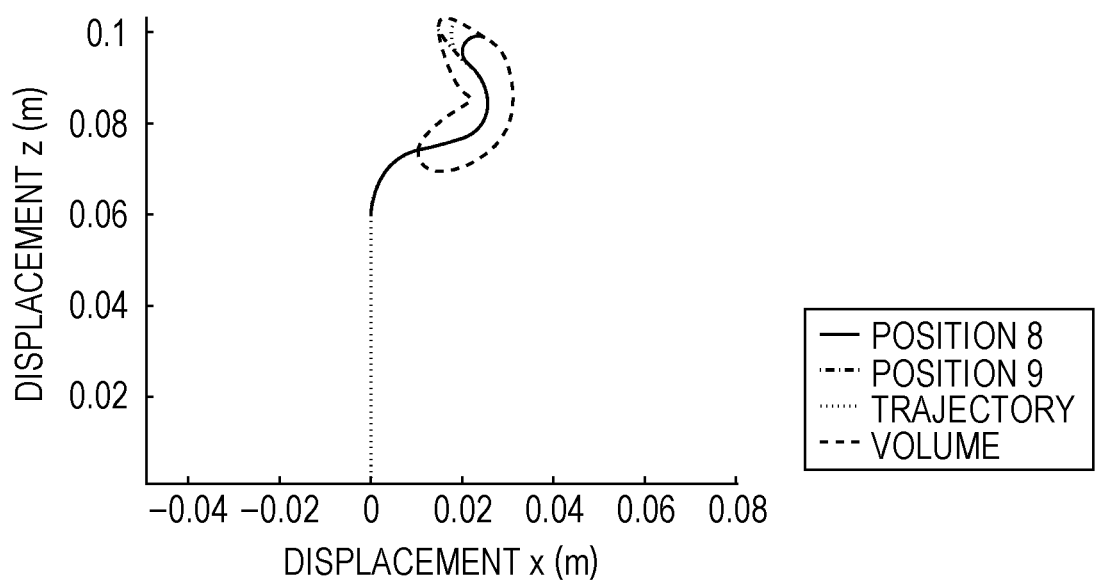
FIG. 15D illustrates trajectory extraction according to the second embodiment.
Figure 16:
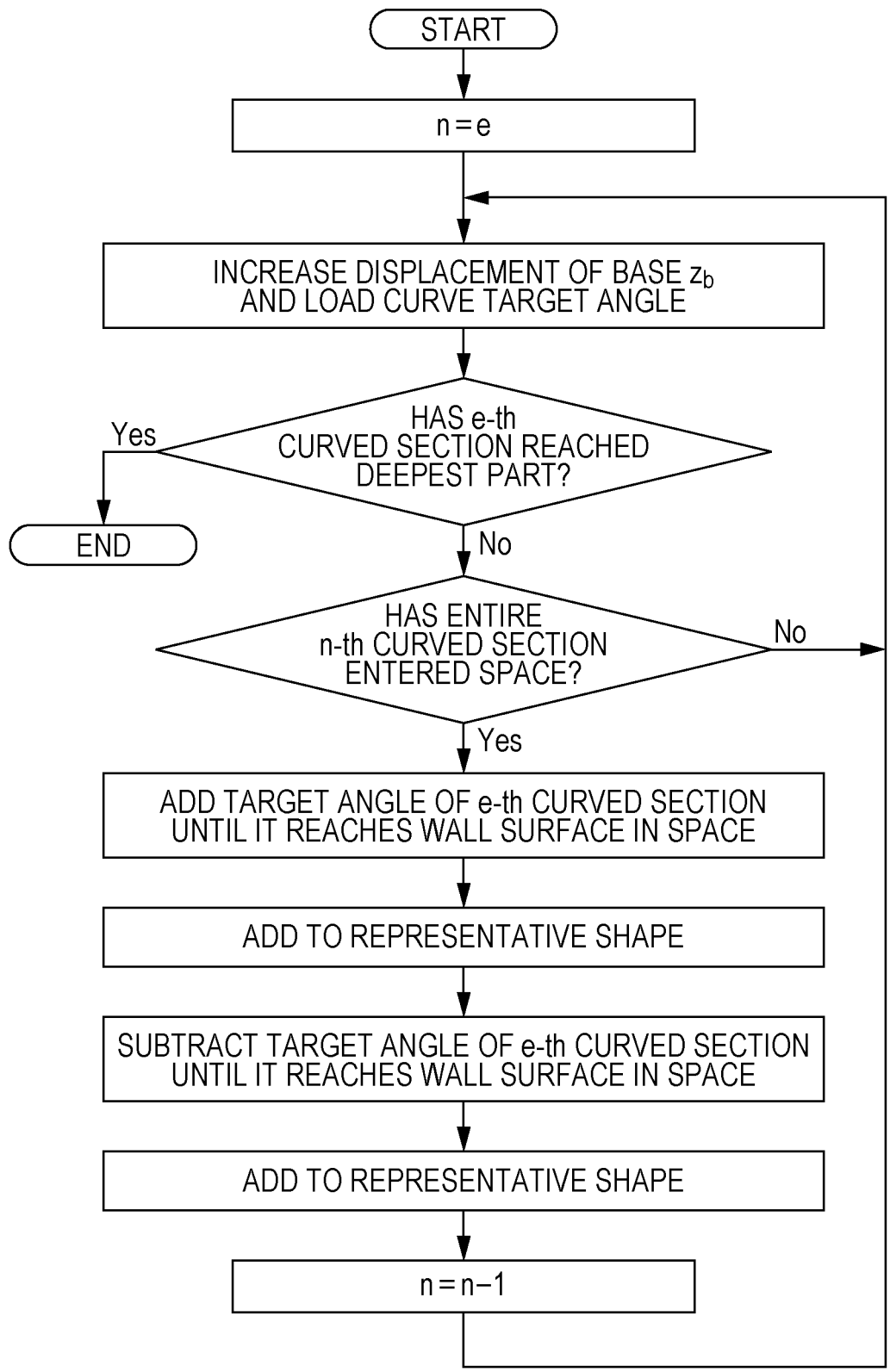
FIG. 16 is a flow diagram for determining a representative shape according to the second embodiment.

Trajectories having a space are illustrated in FIGS. 15A to 15D. The trajectories are depicted by the dotted lines and the spaces are depicted by the broken lines. In the present embodiment, the wall surface within the space is observed by bending the curved section of the most distal end. Then, a position in which the curving angle of the most distal end illustrated in FIG. 15A is increased and reduced until immediately before being in contact with the wall surface within the space depicted by the solid line and the dash-dot line is defined as a representative position by extended steepest descent method. Next, as illustrated in FIG. 15B, in a displacement of the base in which the entire curved section immediately before the most distal end enters the space, positions depicted by the solid line and the dash-dot line are selected as representative positions. This procedure is iterated until the robot reaches the endpoint of the trajectory as illustrated in FIG. 15D via the state illustrated in FIG. 15C. This procedure is illustrated in a flowchart in FIG. 16.

Optimization by the extended steepest descent method is performed by using the obtained representative shape and the modification matrix $\Gamma$ is obtained in the same manner as in the first embodiment. The control accuracy with respect to the curved shape for performing observation and operation of the wall surface within the space can be improved while performing the head end tracking control by performing control by using these modification matrices. In the present embodiment, the Extractor block in FIG. 8 corresponds to the procedure by the flowchart of FIG. 16 and $T_{ra1}$ to $T_{rab}$ in FIG. 8 correspond to b types of curved shapes of the most distal ends within the space generated by this procedure.

Third Embodiment (1. Kinematic Model Modification)

Figure 17:
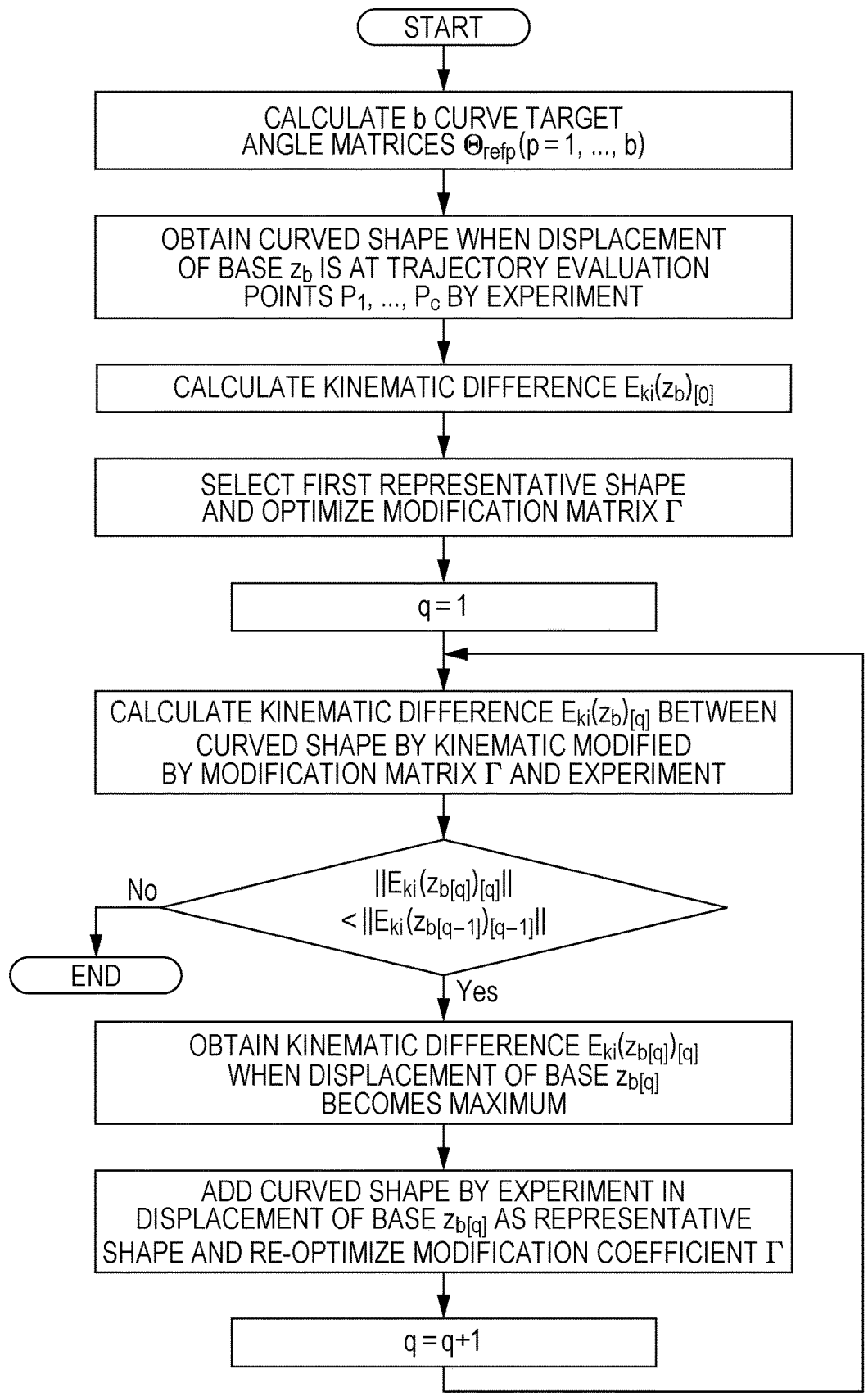
FIG. 17 is a flow diagram according to a third embodiment.

In the first embodiment, the shapes of the unbranched trajectories in the end points thereof are selected as representative shapes (target positions) and the modification matrix $\Gamma$ is optimized. In that case, the kinematic difference is reduced in about 80% of the sections of the entire trajectories only by selecting two types of the representative shapes. In a third embodiment, an optimization method for reducing a kinematic difference of the curved shape of the curvable portion over a wider range of the trajectory although a modification matrix $\Gamma$ in which an operation amount needed for optimization increases will be described. Hereinafter, description will be provided in steps with reference to FIG. 17.

(Step 1)

In accordance with the procedure described in sections 2.1 to 2.3, b curve target angle matrices $\Theta_{refp}$ (p=1 to p=b) for performing the head end tracking control with respect to b unbranched trajectories are calculated.

(Step 2)

A curve target angle $\theta_{ref\zeta}$ when the base is at the $\zeta$-th trajectory evaluation point $P_\zeta$ is provided to the control system. The curved shapes when the displacements of the base $z_b$ are in the trajectory evaluation points $P_1$ to $P_c$ are obtained by the experiment by the same procedure as described in section 3. Then a difference of the curved shapes by the experiment with respect to the curved shape by a kinematic model before using the modification matrix $\Gamma$ is obtained by Expression (31), and defined as a kinematic difference $E_{ki}(z_b)_{[0]}$.

(Step 3)

The first representative shape in each unbranched trajectory is selected, and the modification matrix $\Gamma$ described in section 1.3 is optimized. Here, if a position of each trajectory in the end point is selected as the representative shape, the modification matrix $\Gamma$ will be the same as that of the first embodiment. Each unbranched trajectory has one type of representative shape in the first embodiment, however, in the present embodiment, a plurality of representative shapes are added to each trajectory and the modification matrix $\Gamma$ is re-optimized by iterating steps 4 and 5 q times. However, at least one representative shape may be added to at least one trajectory, and the modification matrix $\Gamma$ may be re-optimized. The thus obtained modification matrix $\Gamma$ is referred to as a modification matrix $\Gamma$ by q-th addition of the representative shape.

(Step 4)

A q-th kinematic difference $E_{ki}(z_b)_{[q]}$ between the curved shape by the kinematic model modified by the modification matrix obtained in the preceding step and the curved shape by the experiment is obtained by Expression (31). Then convergence determination of the kinematic difference is performed. If a predetermined condition in the following Expression is not satisfied and the kinematic difference has increased compared with the (q−1)th time in either one of the unbranched trajectories, iteration is completed.

$$\|E_{ki}(z_b)_{[q]}\| < \|E_{ki}(z_b)_{[q-1]}\| \quad (32)$$

If Expression (32) is satisfied and if the kinematic difference has not increased, the process proceeds to Step 5.

(Step 5)

In each unbranched trajectory, the displacement of the base $z_{b[q]}$ in which the q-th kinematic difference $E_{ki}(z_b)_{[q]}$ becomes the maximum is obtained and the curved shape by the experiment in the displacement of the base $z_{b[q]}$ is added as the representative shape. Then the modification matrix $\Gamma$ described in section 1.3 is optimized and the process returns to Step 4.

In the present embodiment, a norm of the kinematic difference is used for the evaluation of completion of iteration in step 4 as expressed by Expression (32). However, other than the norm, a mean, a maximum value, and a minimum value of the kinematic difference, or displacement of a trajectory termination, and so forth may be used.

(2. Experiment)

Figure 18A:
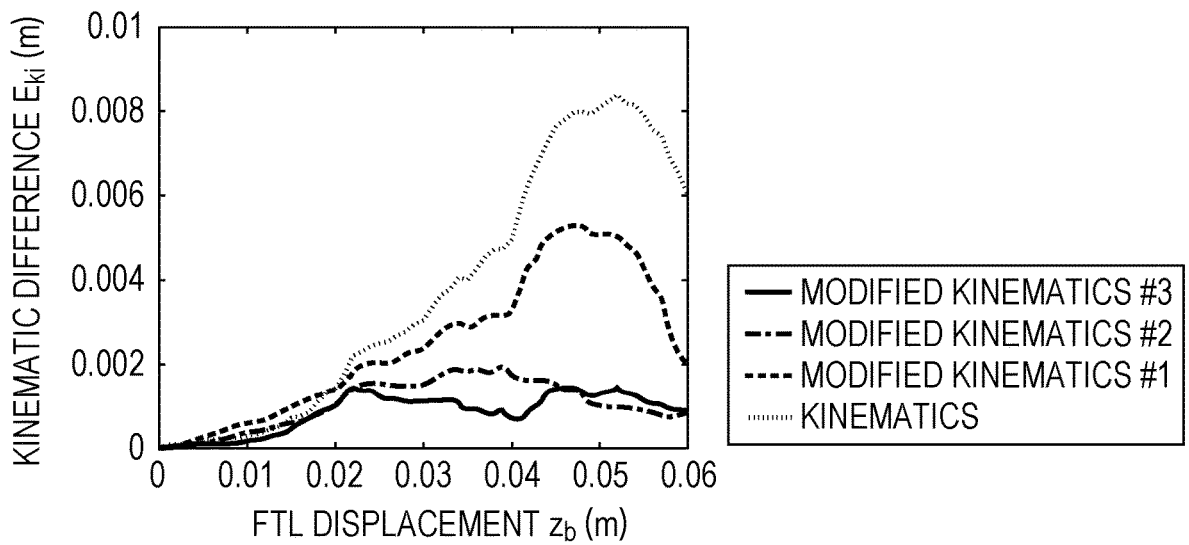
FIG. 18A illustrates a difference when a representative shape is added according to the third embodiment.
Figure 18B:
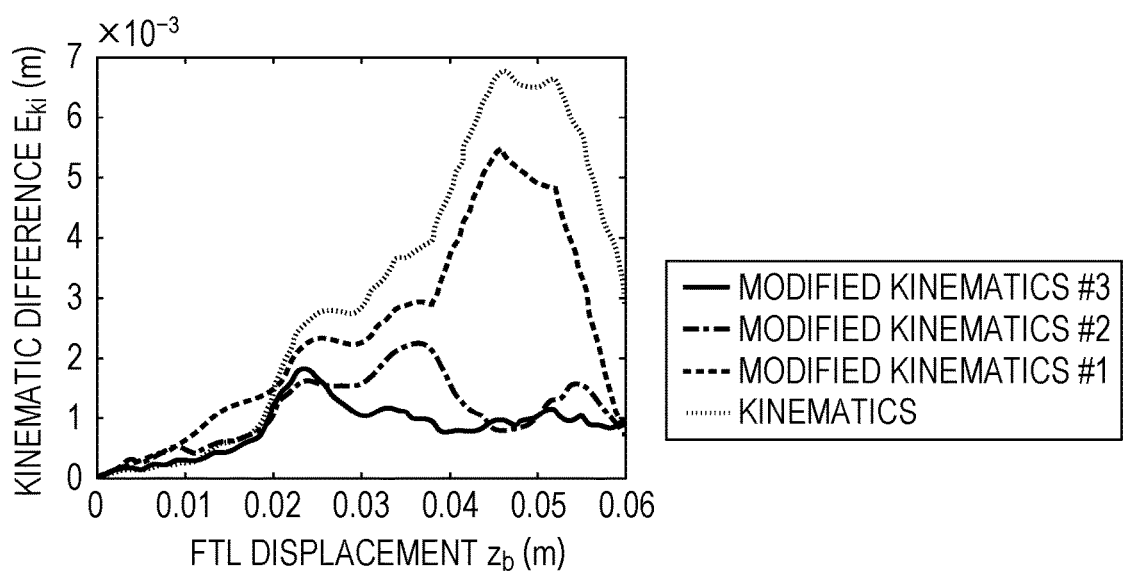
FIG. 18B illustrates a difference when a representative shape is added according to the third embodiment.

As described in the first embodiment, the branched trajectory is illustrated in FIG. 7A, and the first unbranched trajectory and the second unbranched trajectory are extracted as illustrated in FIGS. 7B and 7C, respectively. A difference response between the curved shape by the experiment and the curved shape by the kinematic model in the head end tracking control with respect to the first unbranched trajectory and the second unbranched trajectory of FIGS. 7B and 7C are illustrated in FIGS. 18A and 18B, respectively. Differences by the kinematic models using the modification matrix $\Gamma$ by the first, the second, and the third addition of the representative shapes (simply referred to as differences by addition of the representative shapes) are depicted by the broken line, the dash-dot line, and the solid line, respectively, and an unmodified kinematic difference for the comparison is depicted by the dotted line. In the first unbranched trajectory depicted by the broken line in FIG. 18A, the kinematic difference becomes the maximum at displacement of the base zb=0.047 m and, in the second unbranched trajectory depicted by the broken line in FIG. 18B, the kinematic difference becomes the maximum at displacement of the base zb=0.046 m. Then, the curved shape in the displacement in which the kinematic difference becomes the maximum is added as a representative shape, and the modification matrix $\Gamma$ is optimized by the second addition of the representative shape. The difference response by the second addition of the representative shape is depicted by the dash-dot line in FIGS. 18A and 18B. It is indicated that the kinematic difference has been significantly reduced over the entire region of the trajectory by adding the representative shape and re-optimizing the modification matrix $\Gamma$. Further, the curved shape at displacement of the base zb=0.039 m is added to the first unbranched trajectory and the curved shape at displacement of the base zb=0.037 m is added to the second unbranched trajectory as representative shapes, and the modification matrix $\Gamma$ is optimized by the third addition of the representative shape. The difference response by the third addition of the representative shape is depicted by a solid line in FIGS. 18A and 18B. This indicates that the kinematic difference is further reduced especially in 0.03 m to 0.04 m.

Figure 19A:
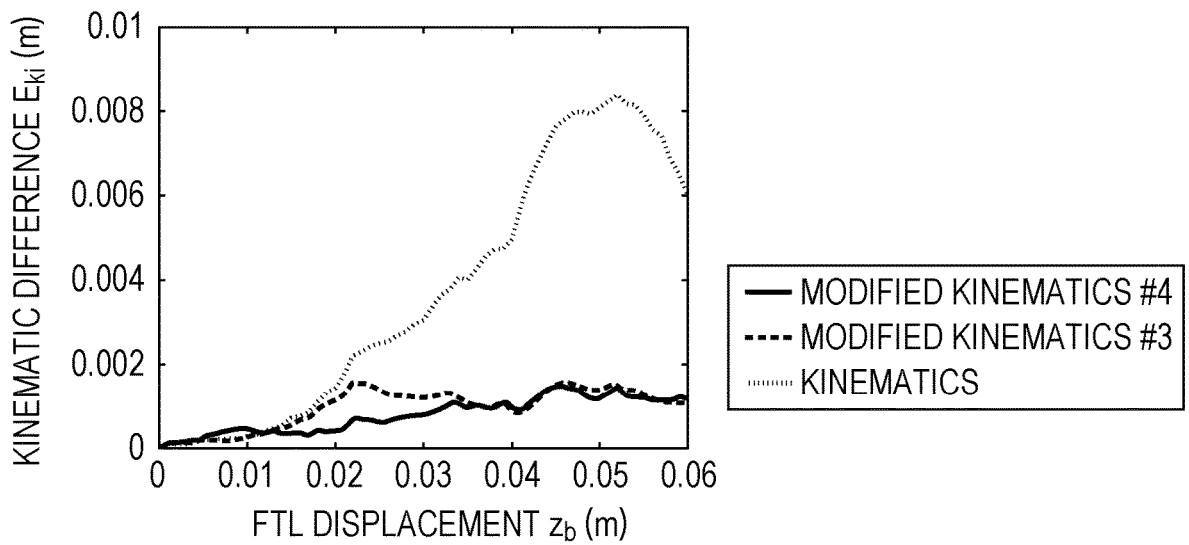
FIG. 19A illustrates a difference when a representative shape is further added according to the third embodiment.
Figure 19B:
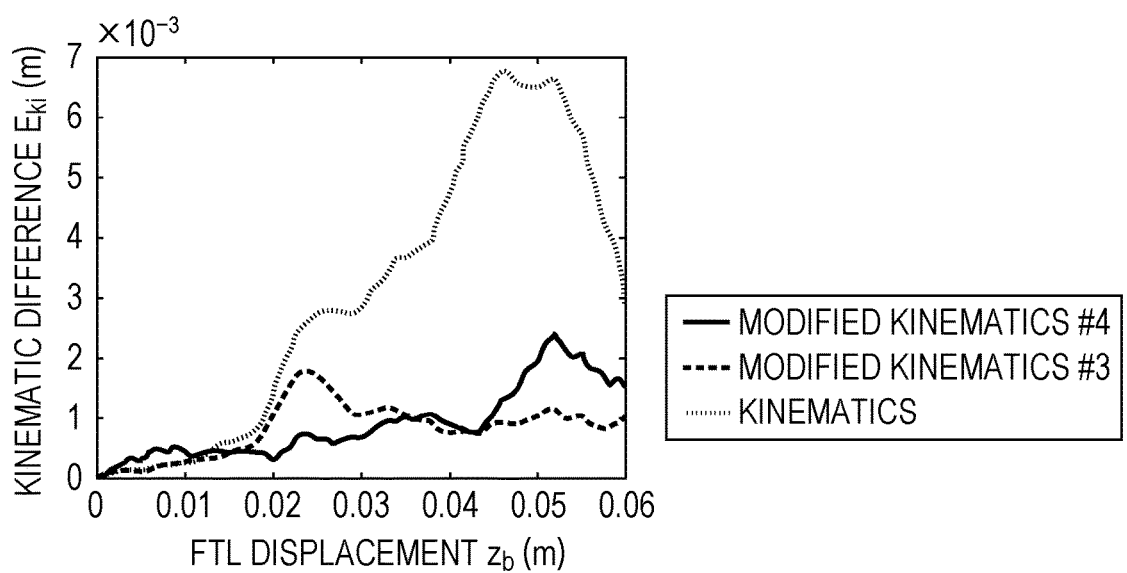
FIG. 19B illustrates a difference when a representative shape is further added according to the third embodiment.
Figure 20:
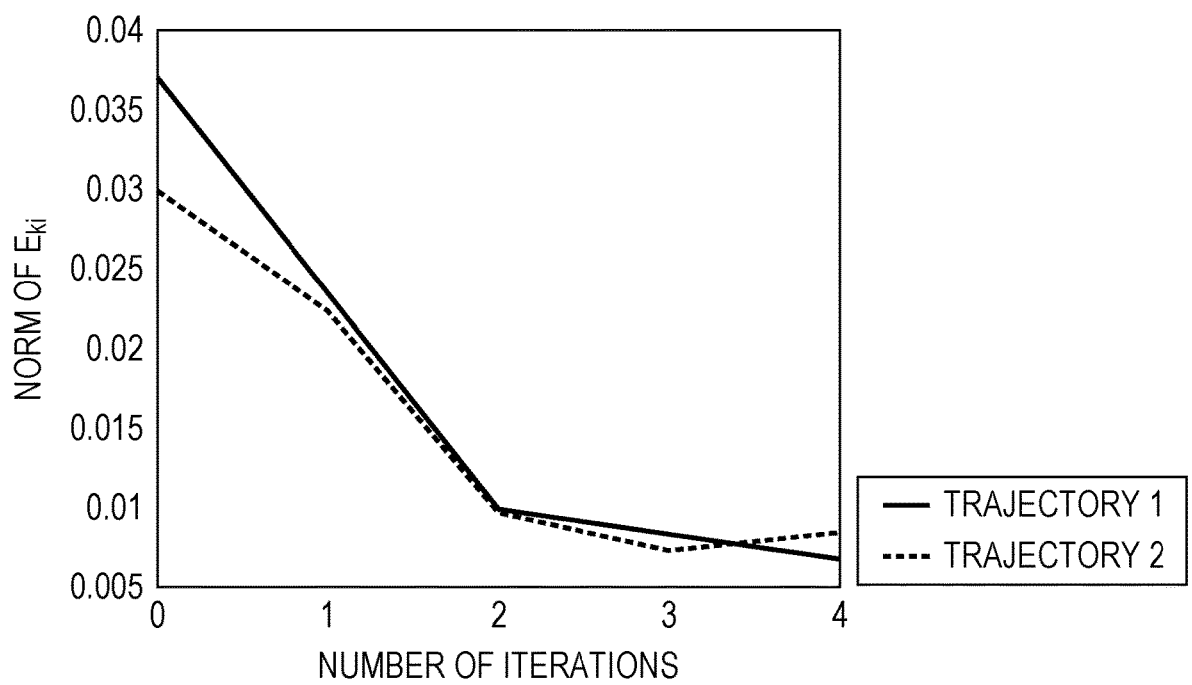
FIG. 20 illustrates the norm of a kinematic difference.

Further, re-optimization of the modification matrix $\Gamma$ by the fourth addition of the representative shape is performed by using the difference response by the third addition of the representative shape. The kinematic response is depicted by a solid line in FIGS. 19A and 19B. An unmodified kinematic difference for the comparison is depicted by the dotted line, and a difference response by the third addition of the representative shape is depicted by the broken line. In the first unbranched trajectory illustrated in FIG. 19A, the difference is further reduced. However, with the difference response of the second unbranched trajectory illustrated in FIG. 19B, the difference by the fourth addition of the representative shape increases compared with the third addition of the representative shape near displacement of the base $z_b$=0.052 m. In order to evaluate the kinematic difference with respect to the number of times of addition of the representative shapes, norms of the kinematic difference is obtained. The norm of the kinematic difference about the first unbranched trajectory is depicted by the solid line and the norm of the kinematic difference about the second unbranched trajectory is depicted by the broken line in FIG. 20. It is indicated that the kinematic difference of the second unbranched trajectory increases by the addition of the fourth representative shape, and Expression (32) is not satisfied. Then, update of the modification matrix $\Gamma$ is completed and the modification matrix $\Gamma$ by the third addition of the representative shape can be employed as the modification matrix.

As described above, with the approach described in the present embodiment, by employing the position of the continuum robot of which kinematic difference is to be reduced as a representative shape, the kinematic difference of the curved shape of the curvable portion can be reduced in an area greater than those by the approaches of the first and the second embodiments.

OTHER EMBODIMENTS

As can be understood from the above discussion, the control method has been described with an assumption that the robot is divided into c equal sections each corresponding to an evaluation point of the robot. It is also assumed that the entire trajectory is divided into 2c equal parts. It is beneficial in reducing calculation load for the kinematic model of the robot when the number of sections of the trajectory is a multiple of the number of evaluation points of the robot (2 in the above example). It is also beneficial in reducing the calculation load to set the length of c to be a distance the robot moves per evaluation step.

Further, an input means such as a mouse, a touch screen, or the like may be provided on the system to enable a user of the system to identify the trajectory to be followed by the robot. In one example, the system further comprises a display controller that causes a display unit (LCD, CRT, etc.) to display an image on which the user can identify the trajectory. For example, the user may draw a line that represents the trajectory or input a plurality of points that the robot should follow. In the latter case, a controller may perform interpolation of the input points to form a line representing the trajectory and thereafter divide the trajectory into a plurality of sections as discussed above. The image provided on the display unit may be an image taken using a camera, medical devices (MRI, CT, etc.), acoustic (e.g. ultrasonic) inspection apparatus, or the like.

Embodiments described above may be modified in a way that an aspect of one embodiment is combined with an aspect of another embodiment as long as the combination falls within the spirit of the present application.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following Claims is to be accorded the broadest interpretation so as to encompass all such modifications and equivalent structures and functions.

This application claims the benefit of Japanese Patent Application No. 2016-162297, filed Aug. 22, 2016, and No. 2017-090882, filed Apr. 29, 2017, which are hereby incorporated by reference herein in their entirety.

REFERENCE SIGNS LIST

100 continuum robot
101 to 106 curved sections (first curvable portion, second curvable portion)
111 to 116 wires (first wire, second wire)
131 to 136: actuators (control units)

The invention claimed is:

1. A continuum robot, comprising:
    a plurality of curvable portions separately driven by a wire and capable of curving; and
    a control unit configured to control positions of the plurality of curvable portions based on a kinematic model which matches positions of the curvable portions and driving amounts of the wires,
    wherein the continuum robot further includes a kinematic model modification unit configured to calculate a modification value for modifying the kinematic model based on a target position and a measured position about each of the cases in which the plurality of curvable portions take a plurality of positions having at least one intersection,
    wherein the kinematic model modification unit uses a modification result in at least one of the plurality of positions as an initial value to modify the kinematic model in another position, and synthesizes the plurality of modification values, and
    wherein the kinematic model modification unit extracts a plurality of target positions from a branched trajectory which is the plurality of positions having at least one intersection, generates a curving angle target value corresponding to a target position among the plurality of target positions, operates a displacement of the curvable portion from the curving angle target value, and operates a modification matrix which is the modification value from a measured displacement, the operated displacement, and the initial value.

2. The continuum robot according to claim 1, wherein the kinematic model modification unit extracts the plurality of target positions from the plurality of positions having at least one intersection in a trajectory having a space, generates the curving angle target value corresponding to the target position among the plurality of target positions, operates the displacement of the curvable portion from the curving angle target value, and operates the modification matrix which is the modification value from the measured displacement, the operated displacement, and the initial value.

3. The continuum robot according to claim 1, wherein the kinematic model modification unit obtains the modification value using an algorithm which employs an optimization technique to reduce a difference between the measured displacement and the operated displacement.

4. The continuum robot according to claim 3, wherein the kinematic model modification unit obtains a measurement displacement of the curvable portion controlled by a driven displacement of the wire in accordance with data of a first target position among the plurality of positions of the continuum robot, obtains a modification value with respect to the first target position by a steepest descent method by using the measurement displacement, the data of the first target position, and the initial value, and uses this approach also to a second target position to obtain a modification value with respect to the second target position, so as to obtain a modification value with respect to each of the plurality of positions and synthesizes the plurality of modification values.

5. The continuum robot according to claim 4, wherein the kinematic model modification unit uses the modification value obtained with respect to the first target position as an initial value of a modification value of a steepest descent method with respect to the second target position.

6. The continuum robot according to claim 4, wherein the kinematic model modification unit iteratively uses the optimization technique, and uses a modification value obtained in a first previous time as an initial value of the modification value of each time.

7. The continuum robot according to claim 3, wherein the kinematic model modification unit obtains a mean of all the modification values, and sets the obtained mean to the modification value.

8. The continuum robot according to claim 1, wherein the control unit obtains a curving angle modified by multiplying a curving angle target value of the curvable portion by an inverse of the modification value, and controls the curvable portion by a driving displacement of the wire operated in accordance with the modified curving angle.

9. The continuum robot according to claim 8, wherein the control unit uses an inverse matrix of the modification matrix which is the modification value as the inverse.

10. The continuum robot according to claim 8, wherein the control unit performs not only control of a previously set curved shape, but also control of a curved shape by a real-time operation by adding an additional target value of the curved shape to a target value of the curving angle.

11. The continuum robot according to claim 8, wherein the control unit performs head end tracking control.

12. The continuum robot according to claim 11, wherein the kinematic model modification unit adds a position of the curvable portion at a displacement at which a difference between a displacement obtained by measuring a displacement of a curvable portion by the head end tracking control in the branched trajectory and the calculated displacement becomes a maximum value is added to a target position, and operates a modification matrix which is the modification value about the target position including the added position.

13. The continuum robot according to claim 12, wherein the kinematic model modification unit iterates adding the position of the curvable portion to the target position and operating the modification matrix until the difference satisfies a predetermined condition.

14. A control method of a continuum robot which includes a plurality of curvable portions separately driven by a wire and capable of curving, and a control unit configured to control positions of the plurality of curvable portions based on a kinematic model which matches positions of the curvable portions and driving amounts of the wires, the method comprising:

obtaining a curving angle modified by multiplying a curving angle target value of the curvable portion by an inverse matrix of a modification value obtained using a modification method;

controlling the curvable portion by a driving displacement of the wire operated in accordance with the modified curving angle;

calculating the modification value for modifying the kinematic model based on a target position and a measured position about each of the cases in which the plurality of curvable portions take a plurality of positions having at least one intersection; and synthesizing the plurality of modification values, wherein in the calculation step, a modification result in at least one of the plurality of positions is used as an initial value in modifying the kinematic model in another position, and wherein, in the calculation step, a plurality of target positions are extracted from a branched trajectory which is the plurality of positions having at least one intersection, a curving angle target value corresponding to a target position among the plurality of target positions is generated, a displacement of the curvable portion is operated from the curving angle target value, and a modification matrix which is the modification value is operated from a measured displacement, the operated displacement, and the initial value.

15. The control method according to claim 14, wherein, in the calculation step, the plurality of target positions is extracted from the plurality of positions having at least one intersection in a trajectory having a space, the curving angle target value corresponding to the target position among the plurality of target positions is generated, the displacement of the curvable portion is operated from the curving angle target value, and the modification matrix which is the modification value is operated from the measured displacement, the operated displacement, and the initial value.

16. The control method according to claim 14, wherein, in the calculation step, the modification value is obtained using an algorithm which employs an optimization technique to reduce a difference between the measured displacement and the operated displacement.

17. The control method according to claim 14, further comprising the steps of:

measuring the displacement of the curvable portion by head end tracking control in the branched trajectory;

adding a position of the curvable portion at a displacement at which a difference between the measured displacement and the operated displacement becomes a maximum value to a target position; and operating a modification matrix which is the modification value about a target position including the added position.

18. The control method according to claim 17, wherein from measuring step to the operating step are iterated until the difference satisfies a predetermined condition.

* * * * *